(12) United States Patent
Turner et al.

(10) Patent No.: US 6,868,422 B2
(45) Date of Patent: Mar. 15, 2005

(54) KNOWLEDGE ACQUISITION IN EXPERT SYSTEMS

(75) Inventors: Richard Turner, Manchester (GB); Peter Duke, Llanberis (GB)

(73) Assignee: Empiricom Technologies Limited, Manchester (GB)

( * ) Notice: Subject to any disclaimer, the term of this patent is extended or adjusted under 35 U.S.C. 154(b) by 430 days.

(21) Appl. No.: 10/034,784

(22) Filed: Dec. 27, 2001

(65) Prior Publication Data

US 2003/0115170 A1 Jun. 19, 2003

(30) Foreign Application Priority Data

Dec. 14, 2001 (GB) .............................................. 129957

(51) Int. Cl.[7] .................................................. G06F 7/00
(52) U.S. Cl. ....................... 707/101; 707/100; 707/102; 707/104.1
(58) Field of Search ..................... 707/1–104.1; 706/12, 706/45–47, 52, 50, 59–60, 61, 902, 911, 917, 10, 11, 53, 900, 903, 904, 916, 919, 921; 379/111, 133, 14, 1.01, 9; 714/1, 25–26, 100, 699, 712; 702/127, 182, 183, 185; 704/1, 8

(56) References Cited

U.S. PATENT DOCUMENTS

| | | | | |
|---|---|---|---|---|
| 4,754,409 A | * | 6/1988 | Ashford et al. ................ | 706/10 |
| 4,763,277 A | * | 8/1988 | Ashford et al. ................ | 706/47 |
| 4,809,219 A | * | 2/1989 | Ashford et al. ................ | 706/50 |

(List continued on next page.)

FOREIGN PATENT DOCUMENTS

| | | |
|---|---|---|
| EP | 0468754 | 1/1992 |
| EP | 0475964 | 3/1992 |
| EP | 0481477 | 4/1992 |
| WO | WO 86/00156 | 3/1986 |
| WO | WO 88/05574 | 7/1988 |

OTHER PUBLICATIONS

Article of Kevin T. Kelly entitled "Learning Theory and Epistemology" Department of Philosphy dated Sep. 29, 2001 (Retrieved from the internet), pp. 1–20.

Article of Terence Parsons entitled "The Traditional Square of Opposition", The Stanford Encyclopedia of Philosphy (Spring 1999 Edition) (Retrieved from the internet), pp. 1–12.

"Case–Based Reasoning: A Review" by Ian Watson & Farhi Marir, The Knowledge Engineering Review, 1994, pp. 1–39.

"An Interactive Visual Language for Term Subsumption Languages" by Brian R. Gaines, 1991, pp. 1–14.

"Common Knowledge, Knowledge Engineering Consultants" by Pether Duke, Reprinted from the Feb. 1991 issue of Expert Systems Applications, pp. 1–4.

"Advances in Elicitation by Exception" by Simon Brooke, Common Knowledge Ltd., pp. 1–8.

Transforming Rules and Trees into Comprehensible Knowledge Structures: by Brian R. Gaines, 1996, pp. 1–18.

(List continued on next page.)

*Primary Examiner*—Greta Robinson
*Assistant Examiner*—Linh Black
(74) *Attorney, Agent, or Firm*—Harness, Dickey & Pierce, P.L.C.

(57) ABSTRACT

A method of knowledge acquisition for entering data into a computer database in a readily computable format, comprises eliciting a set of data statements using an analysis structure determined from an underlying mathematical base, combined with a genuine falsificationist epistemology, entering elicited data statements into a database structured as a plurality of data entries, each data entry comprising a label, a said data statement and a default value, and a root node indicator; storing a relationship between said data entries as a connectivity lattice.

5 Claims, 16 Drawing Sheets

U.S. PATENT DOCUMENTS

| | | | | |
|---|---|---|---|---|
| 4,837,689 A | * | 6/1989 | Tanaka et al. | 704/8 |
| 4,916,633 A | * | 4/1990 | Tychonievich et al. | 706/60 |
| 4,943,933 A | * | 7/1990 | Miyamoto et al. | 706/50 |
| 4,964,125 A | * | 10/1990 | Kim | 714/26 |
| 4,967,368 A | * | 10/1990 | Bolling et al. | 706/52 |
| 5,261,037 A | * | 11/1993 | Tse et al. | 706/60 |
| 5,295,230 A | * | 3/1994 | Kung | 706/59 |
| 5,319,740 A | | 6/1994 | Yamada et al. | |
| 5,471,560 A | | 11/1995 | Allard | |
| 5,546,507 A | | 8/1996 | Staub | |
| 5,671,326 A | * | 9/1997 | Geisow et al. | 706/62 |
| 5,673,369 A | | 9/1997 | Kim | |
| 5,870,768 A | | 2/1999 | Hekmatpour | |
| 5,963,447 A | * | 10/1999 | Kohn et al. | 700/49 |
| 6,088,689 A | * | 7/2000 | Kohn et al. | 706/10 |
| 6,424,967 B1 | * | 7/2002 | Johnson et al. | 707/3 |
| 6,601,055 B1 | | 7/2003 | Roberts | 706/45 |
| 2004/0059436 A1 | | 3/2004 | Anderson et al. | 700/2 |

OTHER PUBLICATIONS

"Issues in the Development of an Industrial Bioprocess Advisory System", by Jarka Glassey, Gary Montague and Pankaj Mohan, TIBTECH Apr. 2000 (vol. 18), pp. 136–141.

"Exception Hierachy Based Knowledge Representations for Expert Systems" by Rense Lange and Sue Chien, 1987, pp. 148–150.

"A Graphical Inference Mechanism", by Peter Mott & Simon Brooke, Expert Systems, May 1987, vol. 4, No. 2, pp. 106–117.

KnAcq Method Manual entitled The KnAcq: A Methodology for Knowledge Acquisition, Common Knowledge Ltd., 1989, 1990, 1991, pp. 1:7–pp. 13:4.

* cited by examiner

| Feature Dictionary | | Elicited from: Peter Duke | | | |
|---|---|---|---|---|---|
| | | Elicited by: Switch | | | |
| | | On (date): 28 March 2001 | | | |

| Nickname | Full Name | Type | Default | Pri.Meth |
|---|---|---|---|---|
| Abseil | You have decided to abseil off the rock face | Boolean | False | Question |
| Acute angle | The rope goes over an acute angle (.60 degrees) | Boolean | True | Question |
| Appropriate depth | The crack is of an appropriate depth (between #1 and #10;2cm -8cm) | Boolean | False | Question |
| Appropriate width | The crack is of an appropriate width (between #1 and #10; 2cm - 8cm) | Boolean | False | Question |
| Cams protrude | The back of the cams protrude from the crack | Boolean | False | Question |
| Chock wedged | The chock is made out of a soft metal and can be wedged in the crack | Boolean | False | Question |
| Difficult move | The protection is only for getting round a difficult move or whilst resting | Boolean | False | Question |
| En route | En route to another specified protection location | Boolean | True | Question |
| Flares | The crack flares towards the back | Boolean | True | Question |
| Friend | You have used a friend, number 1 or above | Boolean | False | Question |
| Hex fits | A hex fits in the crack | Boolean | False | Question |
| Lipped crack | The wire is in a lipped crack | Boolean | False | Question |
| Many micros | There are 6 or more micros at the current location | Boolean | False | Question |
| Micro | You are using a micro | Boolean | False | Question |
| Micro only | Micros are the only kind of gear you have available | Boolean | False | Question |
| Pocket | There is a pocket behind the crack | Boolean | False | Question |
| Rock friable | The rock is friable | Boolean | False | Question |
| Small wire | The minimum taper on the wire is less than 2cm | Boolean | True | Question |
| Spike | There is a spike or protrusion from the rock | Boolean | False | Question |
| Suitable Protection | You have acceptably safe protection from falling from the rock | Boolean | False | Question |
| Taper | The crack tapers in the vertical | Boolean | True | Question |
| Tension | The tension would not be maintained during descent | Boolean | False | Question |
| Terminate | The crack terminates | Boolean | False | Question |
| Wire | You can fit a wire | Boolean | Boolean | Question |
| Wired hex | Wired hex in pristine condition | Boolean | False | Question |

Fig. 4

```
C:\knowledge Bases\Rock.kat                                          [_][□][X]
```

| Interaction Trade                     1500 | Report Trace |
|---|---|
| Evaluation started on 16/10/2001 at 17:13:37 | Since the crack terminates you would be advised to... |
| | |
| Q. Is the crack between 2cm and 8cm in width? | |
| A. Yes | 1501 |
| | |
| Q. Is the crack between 2cm and 8cm deep? | Current Report |
| A. Yes | If you lit a hex you will have suitable protection |
| | |
| Q. Does the crack flare towards the back? | |
| A. Yes | 1502 |
| | |
| Q. Does the crack terminate? | Explanation: |
| A. Yes | KB evaluation result:                    1503 |
| | Suitable protection is True |
| Q. Does the crack taper in the vertical? | |
| A. No | Tree Explanation: |
| | |
| Q. Is there a spike or protrusion from the rock? | The tree Suitable Protection returned the following explanation information |
| A. No | The path Hex fits: Rock friable: |
| | 181 |
| Q. Is the rock friable? | |
| A. Yes | The path Hex fits:: Acute angle::Difficult move: |
| | 183 |
| Q. Is the rope going over the extender at an | |
| acute angel (>60 degrees)? | The tree Hex fits returned the following explanation information: |
| A. Yes | The path Appropriate width::Appropriate depth::Flares::Terminate: |
| | 185 |
| Q. Are you performing a difficult move or resting? | |
| A. Yes | The tree Wire did not return any explanation information |
| | |
| Q. Are you using a wired hex in pristine condition? | The tree Micro did not return any explanation information |
| A. No | |
| | The tree Friend did not return any explanation information |

KB at end of evaluation
● Go completely through wihtout pausing
○ Pause after overturns on the root tree only
○ Pause after overturns on all trees

[Go On]  [Reset]

Method Explanations:

The feature A hex fits in the crack was found to be true by evaluating its methods:
   The tree Hex fits evaluated to true The feature The rock is friable was found to be true by evaluating its methods:
   The question is the rock friable? was answered Yes, indicating the feature was true The feature The rope goes over an acute angle (<60 degrees) was found to be true by
evaluating its methods:
   The question Is the rope going over the extender at an acute angle
   (>60 degrees) was answered Yes, indicating the feature was true The feature The protection is only for getting round a difficult move or
whilst resting was found to be true by evaluating its methods:
   The question Are you performing a difficult move or resting? was
   answered Yes, indicating the feature was true The feature Wired hex in pristine condition was found to be false by
evaluating its methods:
   The question Are you using a wired hex in pristine condition? was
   answered No, indicating the feature was false The feature You can fit a wire was found to be false by evaluating its methods:
   The Tree Wire evaluated to false

[SAVE]

Fig. 15

KNOWLEDGE ACQUISITION IN EXPERT SYSTEMS

FIELD OF THE INVENTION

The present invention relates to the field of computer science, but background to the invention can be found in the fields of knowledge management and manipulation, psychology, management theory and epistemology. Particularly although not exclusively the invention relates to a system and method for knowledge and data acquisition for input into an artificial intelligence and/or knowledge based system.

BACKGROUND TO THE INVENTION

Historically the biggest single issue involved in the usage, construction and architecture of knowledge based systems has been the question of how to extract the knowledge, expertise and human decision making capability from one or more humans, in a data format which enables the knowledge, expertise and decision making capability to be computable in a machine. The problem is of sufficient magnitude, that it is well known in the art of knowledge based systems, by the name of "the knowledge elicitation bottle neck".

The elicitation of knowledge from human beings has proved to be a profoundly difficult problem for the information technology industry, to the extent that although great ideas have been produced for computer programs, which embody reasoning capability, the data over which they reason, that is to say the knowledge bases, have been very difficult to construct. Conventional Von Neumann architecture computers having a data processor, a memory and a data storage device require a data base having a relatively rigid architecture. However, the way in which humans think and consider problems does not apparently or clearly follow rigid logical processes. The problem of extracting human knowledge, which often appears to be unstructured and intuitive, into a computable form of data suitable for a conventional computer to process is a difficult technical problem.

Referring to FIG. 1 herein, there is illustrated schematically in diagrammatic form, the knowledge elicitation problem. The problem consists of the extraction of knowledge from a plurality of human individuals 100–103, and conversion of that knowledge into data in a format specific to a data base or knowledge base 104 of a computer 105, in which format the data can be stored directly in the data base, having been entered through an interface 106 of the computer. The data is stored in the data base under control of a processor 107 and memory 108 of a computer.

Referring to FIG. 2 herein, there is illustrated schematically prior art processes carried out for solving the knowledge elicitation problem. The processes shown in FIG. 2 are generic to a range of prior art solutions for capture of knowledge within prior art expert systems. In general, prior art knowledge elicitation processes comprise a knowledge capture process 200 comprising the stages of problem identification, in which a problem to be solved by an expert system is identified;

a knowledge flow identification process;

a knowledge source identification process, in which one or a plurality of experts are identified who can give the relevant information; and actual storage 201 of electronic data in known positions in the data storage device, i. e. within an electronically accessible data base, where the electronic data stored represents knowledge which has been captured from one or more individual experts.

Problems occur in the knowledge capture process 200, in that complete and full knowledge may not be extracted by prior art questioning process. Problems also occur in the arrangement of data into a form suitable for input into a prior art data base architecture, because the data base architecture may not be flexible enough to contain all the complex inter relationships between facts and statements comprising the knowledge.

Prior art database architectures often only allow for one mode of inference over the data contained therein, and do not demand that consistency of the data contained in the database is proved. It is possible for inconsistent information and knowledge to be stored in or introduced into a prior art database.

The inventors have recognized that the vast majority of prior art solutions addressing the knowledge elicitation bottleneck take a psychology based approach, comprising various different methods of asking the expert what they do, recording that information, and producing unstructured text, grids and matrices and applying different types of statistical manipulation to the data in an attempt to derive production rules from the data. That is, prior solutions attempt to produce standard computer understandable clauses, such as IF, THEN, and WHEN rules, in order to establish a rule base. Conventional rule bases, for example PROLOG rule bases, are generally a subset of predicate or propositional calculus, and most prior art knowledge based systems ultimately store their data according to such rule bases.

The inventors have realized that whilst a psychology based approach results in a rich conceptual map of how an expert is thinking in a knowledge domain, it does not actually give a rule base, and the knowledge elicited from a human expert using prior art logic and psychology based methods does not result in directly computable data. In prior art methods there needs to be applied much heavy thought about the unstructured text, information, matrices and grids, in order to try and derive some rules from them, and input them into a computer system, typically finding that this does not work fully, and then having to run known consistency checks because the rule base does not work, followed by a return to the expert for further questioning and re-eliciting knowledge from the expert, repeatedly manipulating the elicited data (sometimes including the application of statistical methods), in a potentially endless iterative loop (although most practical knowledge elicitation processes do stop somewhere).

Prior art knowledge elicitation processes are unable to guarantee consistency or completeness of rule bases determined from those processes, and can result in hundreds or thousands of rules in a knowledge base, which need to be checked for internal self consistency. Prior art systems may result in rule bases where mutually incompatible rules exist within the rule base.

Consequently, prior art knowledge elicitation processes have the major disadvantage that because of the deficiencies of the prior art elicitation processes, the persons carrying out the elicitation of knowledge from human experts, in order to be sufficiently effective, tend to need to become experts themselves. These knowledge engineers would typically require a long training process in order to know what questions to ask a knowledge expert, thus resulting in a large requirement in time, cost and resources for creating knowledge based systems and expert systems.

Problems with the prior art approaches include the fact that often only the result of the rules is elicited, not the rules themselves, and additionally the human expert only recites their conscious knowledge. In the prior art logic and psychology based knowledge elicitation approaches, only the conscious knowledge is addressed.

Consequently, the inventors have realized that prior art logic and psychology based knowledge elicitation processes singularly fail, to a greater or lesser extent, to address sub-conscious knowledge, internal consistency, interrelations, dependencies, or the cognitive explanation of these, and consequently do not overcome the knowledge elicitation bottleneck.

SUMMARY OF THE INVENTION

The inventors have recognized that expert knowledge may be fundamentally defined in terms of not only conscious knowledge, but in terms of tacit, implicit and sub-conscious knowledge. Expertise is the knowledge which has been learnt over the years, which differentiates an expert from a novice, and in particular the fact that an expert can perform things without having to refer to one or more external sources of support or to consciously think about it.

Specific methods according to the present invention aim to allow elicitation of both conscious and subconscious knowledge from a human expert in a consistent and exhaustive manner. This is achieved by a knowledge elicitation process based upon an underlying mathematical determination, combined with a genuine falsificationist epistemology.

The inventors have rejected prior art logic and psychology based approaches and realized that prior art methods of identifying cognitive maps will not yield directly computable or consistent knowledge data, but instead, have taken an approach of questioning what it is which human beings are attempting to do when making decisions. The inventors have approached the knowledge elicitation bottleneck problem from a philosophical point of view of consideration of a belief state, that is a human mind's belief about the world and nature and things around the human mind, and have attempted a codification of western rationalist scientific methodology.

In other words, a human approach to reality is that if someone is asked what motivates a belief hypothesis of that person, there is a tendency for the person to hold that belief hypothesis because there is an amount of evidence which has been gathered to support that belief hypothesis. However, a hypothesis is only as good as the absence of something which undermines that hypothesis, and much of western scientific method is based upon finding facts which undermine hypotheses and can therefore prove them to be false. In the absence of disproof, a hypothesis stance can be considered to be true, or at least not false.

The knowledge acquisition processes disclosed herein operate on the basis that a piece of knowledge which falsifies a hypothesis has greater significance than many pieces of knowledge which support an hypothesis. Therefore, the knowledge acquisition processes described herein aim to operate efficiently, by seeking out a relatively lower number of items of falsifying information which falsifies the hypothesis (each of which creates a new, falsifiable hypothesis), rather than by seeking out a potentially infinite number of knowledge items which support an hypothesis.

This genuine falsificationist paradigm has been converted into a knowledge acquisition process which takes advantage of the efficiencies of the falsificationist approach in obtaining the maximum information in the lowest possible number of knowledge items.

Specific implementations according to the present invention aim to allow conversion of knowledge into a machine computable data form, using a streamlined process involving as few stages as possible.

Specific implementations of the present invention aim to provide automatic elicitation of information from one or more information sources, such as human individuals or electronic text sources.

Specific implementations according to the present invention aim to convert human knowledge directly into data which is input into a computer, for example a computer having a conventional Von Neumann architecture, in a form which enables the computer to immediately use the data in an expert system or knowledge base, without the need to perform further data processing operations prior to usage.

According to one aspect of the present invention there is provided a method of data acquisition for collecting data for entry into a computer entity, said method comprising the processes of:

compiling a set of a plurality of knowledge data statements each knowledge data statement representing an element of a knowledge domain;

creating lattice data, said lattice data defining relationships between said plurality of knowledge data statements;

storing said knowledge data statements in a data storage device of said computer entity; and storing said lattice data in said data storage device of said computer entity.

Further aspects of the invention are as recited in the claims herein.

BRIEF DESCRIPTION OF THE DRAWINGS

For a better understanding of the invention and to show how the same may be carried into effect, there will now be described specific embodiments, methods and processes according to the present invention with reference to the accompanying drawings in which:

FIG. 4 illustrates schematically a layout of a feature dictionary component of a knowledge base according to a specific implementation of the present invention;

FIG. 15 illustrates schematically part of a report generated as a result of the knowledge delivery process.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent, however, to one skilled in the art, that the present invention may be practiced without limitation to these specific details. In other instances, well known methods and structures have not been described in detail so as not to unnecessarily obscure the present invention.

In this specification, the term "expert" is used and refers to a human expert in a domain of knowledge. However, in principle according to the best mode implementations, knowledge can be extracted from a variety of knowledge sources, not limited to human beings, for example electronic or physical databases.

In this specification, the term "knowledge source" is used to refer to a source of knowledge in a knowledge domain. The source of knowledge could be human, for example a human expert, or some other source such as a library, or a database, or a computer storing data.

Figure 1:
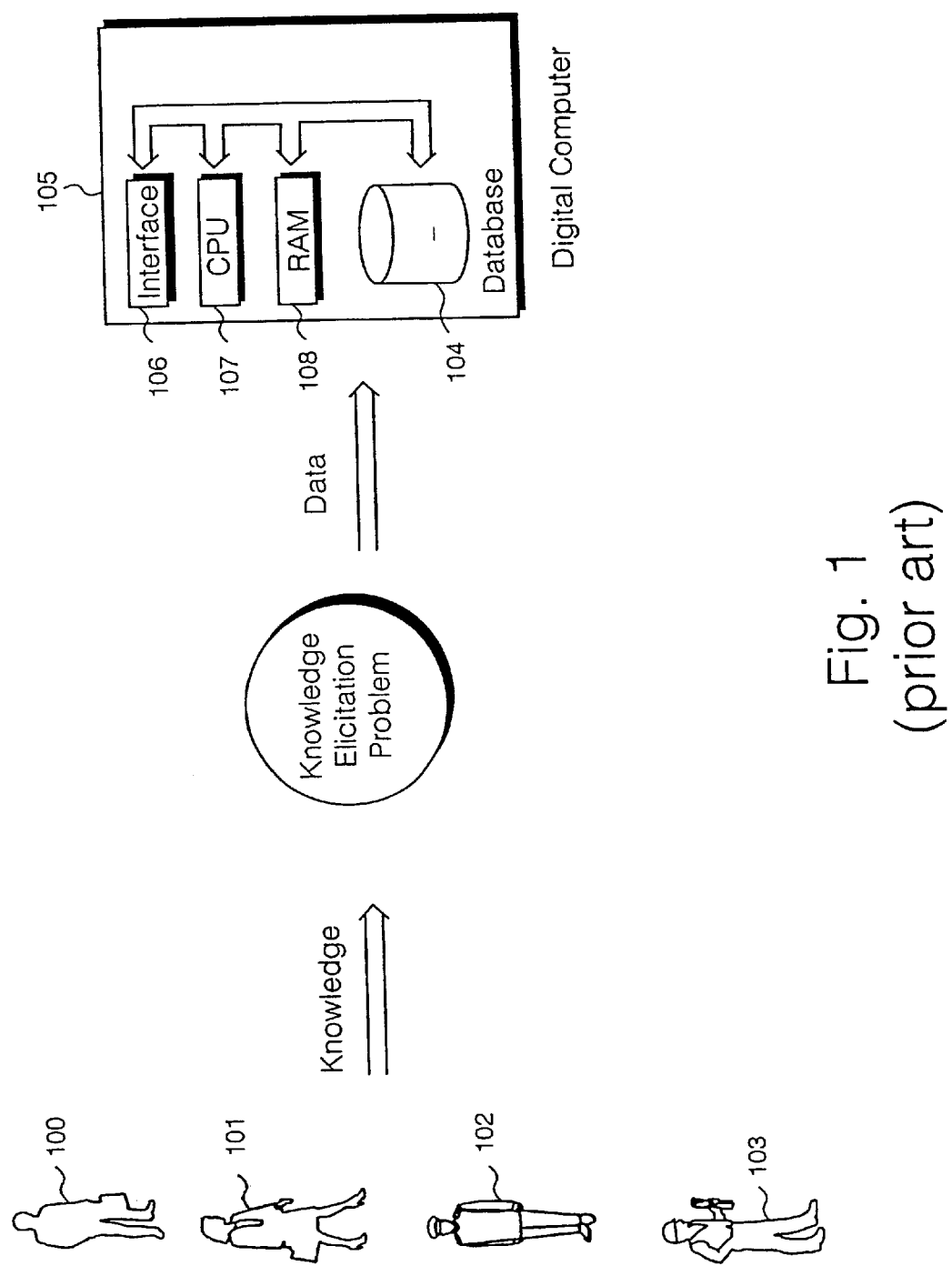
FIG. 1 illustrates schematically the prior art knowledge elicitation problem.
Figure 2:
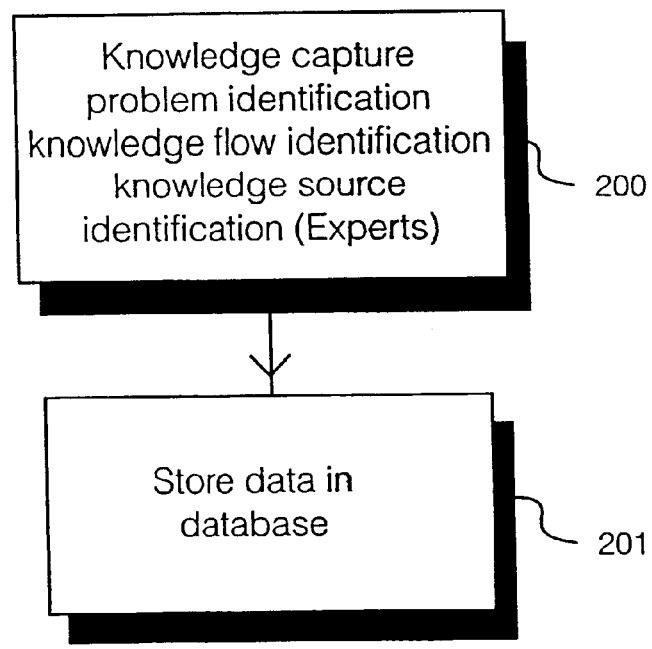
FIG. 2 illustrates schematically prior art process steps carried out in known solutions to the knowledge elicitation problem.
Figure 3:
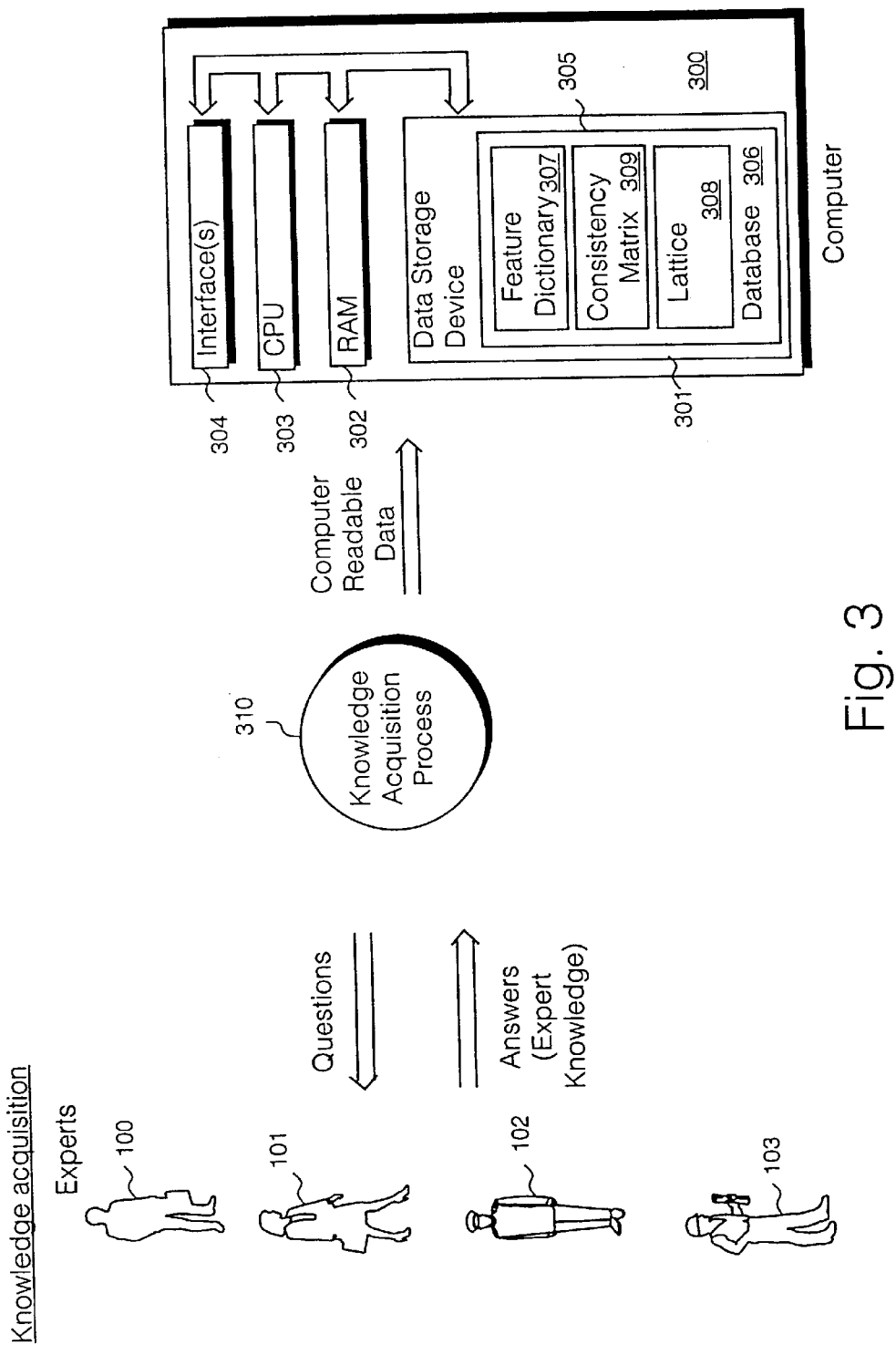
FIG. 3 illustrates schematically a knowledge acquisition system according to a specific implementation of the present invention.

Referring to FIG. 3 herein, there is illustrated schematically an overall view showing a knowledge acquisition system according to a specific implementation of the present invention. The knowledge acquisition system comprises a computing system 300 having one or more data storage devices 301, one or more memory devices 302, one or more data processors 303 and one or more interfaces 304 for entering and extracting electronic data, including optionally a user interface including a video display device, keyboard for text data entry, and pointing device; and a knowledge base 305 for producing a set of questions to be asked of or put to a set of human individuals, and for acquiring a set of answers from those individuals, and for converting the answers into computer readable data, wherein the computer readable data is in a structured format suitable for storage into a database within the data storage device(s) 301 without any further significant pre-processing or manipulation of data being required.

A database 306 within the data storage device stores the knowledge base 305. The knowledge base 305 comprises a set of knowledge statements (also referred to as a feature dictionary) 307, comprising a list of unique elements of an expert's domain of knowledge; a connectivity lattice 308 comprising data describing a plurality of 'except when' or mixed semantic relationships between individual elements in the feature dictionary; and a consistency matrix 309.

Referring to FIG. 4 herein, there is illustrated schematically an architecture of feature dictionary element 307 of the knowledge base 305 stored in a data storage device of a computer entity. The feature dictionary 400 comprises a list of feature statements 401, each comprising a statement of knowledge data. Each feature statement is shown as a row of a feature dictionary 400.

The feature dictionary has a name datum 402, by which the dictionary can be identified; a file name 403 identifying a path within a file system of the computer where the feature dictionary is stored in the data storage device; one or more expert name(s) 404 of one or more individuals from whom the statements of knowledge have originated ("the experts"); one or more facilitator names of one or more individual interviewers 405 who elicited the knowledge statements from that individual expert or set of individual experts; and one or more date data 406 describing one or more dates on which the statements were elicited by the individual interviewer(s) from the one or more experts.

Each feature statement comprises a nickname 407, being a label which identifies the feature statement; knowledge statement data 408; a type data 409 identifying the type of knowledge statement data, for example Boolean; a default condition 410 of the knowledge statement, for example 'true' or 'false' or 'no default'; and method data 411, describing the mechanism by which the knowledge statement is evaluated.

The ordering of feature statements within the feature dictionary in the example shown shows feature statements listed in alphabetical order of nickname. However, the order of rows within the feature dictionary is not critical, since individual feature statements are related to each other by the connectivity lattice 308. Various different orderings are possible and may be desirable.

Figure 5:
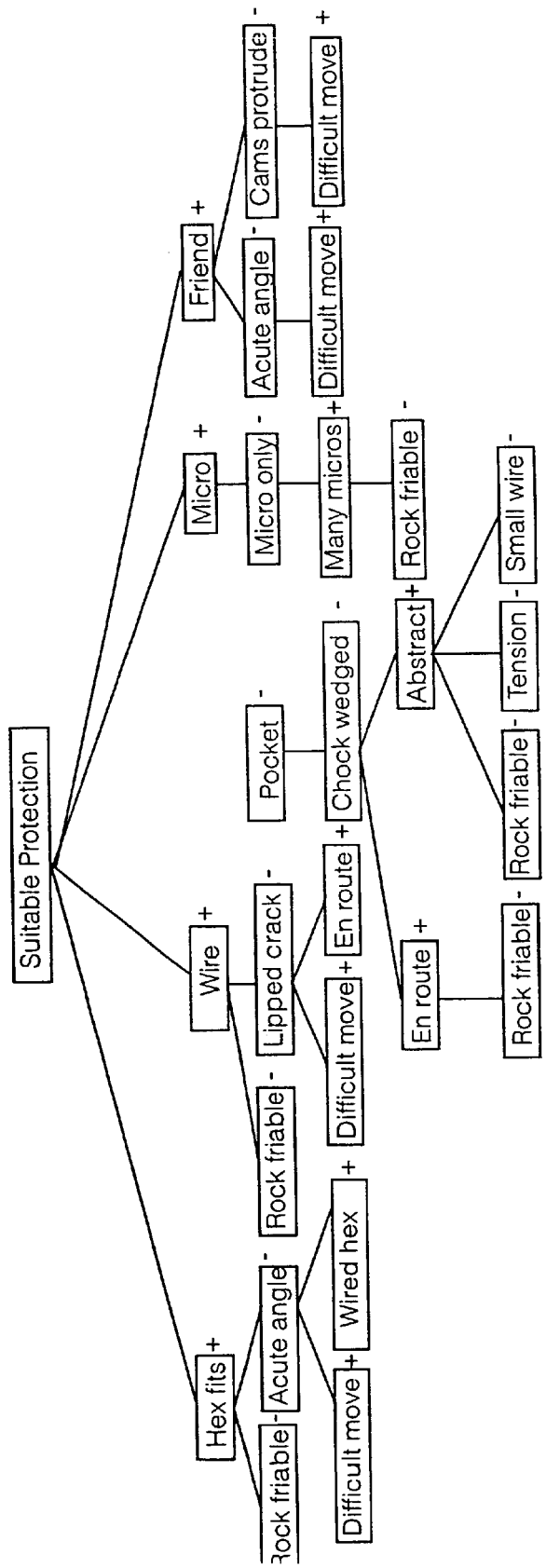
FIG. 5 illustrates schematically a layout of a lattice data according to a specific implementation of the present invention.

Referring to FIG. 5 herein, there is illustrated schematically an example of a connectivity lattice 308. The lattice comprises a plurality of nodes and links connected in an hierarchical tree structure. The lattice comprises a plurality of nicknames appearing in said feature dictionary, and a plurality of connections between said nicknames, wherein said nicknames are assigned to nodes of the lattice, and logically connected in relationship to each other in an hierarchical tree structure having a root, a plurality of leaves, and in this example a plurality of nodes between the root and leaves. Assigned to each node is a root value indicator, designating that if a knowledge statement connected to the node is true, then the root value indicator indicates a status of the objective statement. For example, the objective statement "suitable protection" has a default negative indicator. However, if a hex fits, this is an exception to not having suitable protection, so the "+" next to the "hex fits" node indicates that where a hex fits, then there is suitable protection. There are some exceptions to this condition however. For example, if the rock is friable (rock friable node), then even though the hex fits, suitable protection is false. Hence, a negative sign accompanies the "rock friable" node, indicating that if a hex fits, but the rock is friable, then the objective statement "suitable protection" is false.

Figure 6:
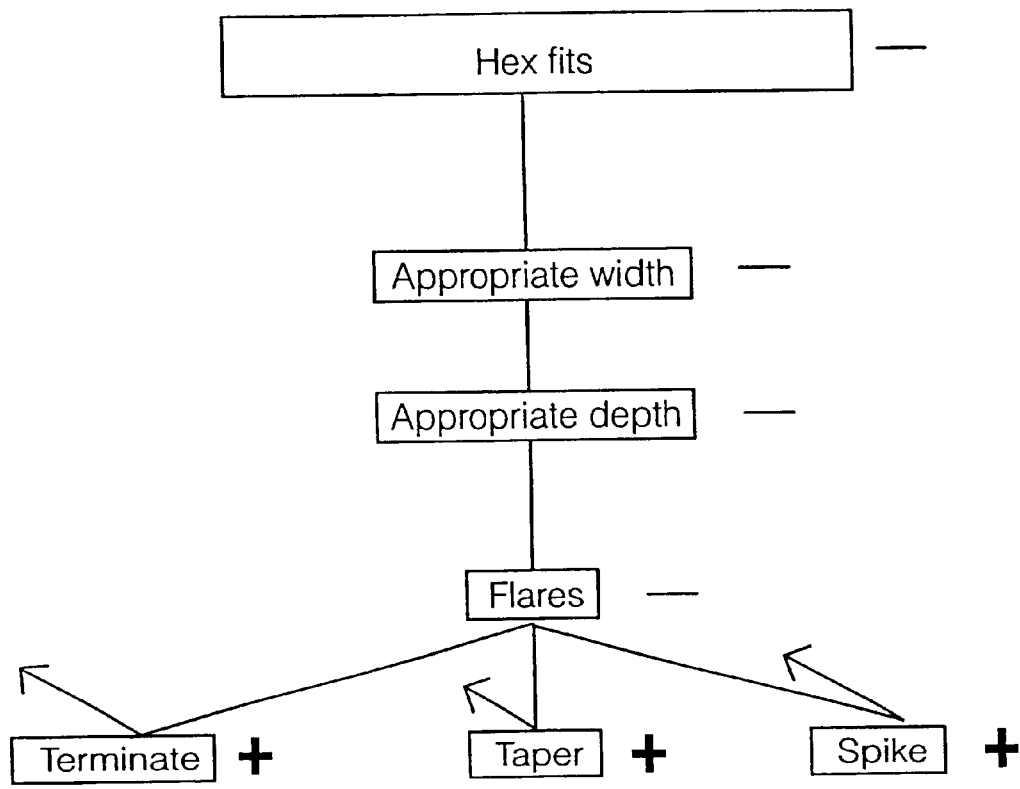
FIG. 6 illustrates schematically a sub network underlying a node of the lattice data of FIG. 5.

Referring to FIG. 6 herein, there is illustrated schematically a sub network of the lattice data of FIG. 5. For each intermediate node in the lattice data, there may be exceptions to the knowledge statement connected with that node. These lead to other, lower level nodes, underneath that node. For example, the node "hex fits" may have a lower node "rock friable", and another lower node "acute angle". In addition a node may lead off in another dimension to a further set of lower nodes as illustrated in FIG. 6. Nodes in this alternative dimension serve to clarify and explain a knowledge statement assigned to a node, for example in the case of FIG. 6, in order to determine whether a hex fits, factors such as appropriate width, appropriate depth, whether there are any flares or not, and whether those flares terminate, taper or spike are all relevant. Each node in the alternative dimension is assigned a nickname, has a knowledge statement, and a root value indicator.

There will now be described operation of knowledge acquisition process 310, by means of a specific example. The example described herein relates to the knowledge domain of rock climbing. However, it will be understood by those skilled in the art that the knowledge acquisition process is capable of application in any decision-making knowledge domain.

Because the technical problem involves a human-computer interface, and requires the extraction of knowledge from human beings, that is, experts in the knowledge domain in question, a set of questions is presented to one or more humans, and the humans provide answers to the questions in a known human language, for example the English language, which can be converted directly to text characters, such as ASCII characters, which are readily computer readable. The knowledge acquisition process in the general case is independent of human language or computer language, although in the best mode, the human language of English is used, and various computer languages and frameworks (including Delphi, C++, C#, .NET, and XML) are used.

The objective of the knowledge acquisition process is to fill in the feature dictionary with a set of knowledge statements, wherein each knowledge statement is unique, to determine the connectivity lattice between data entries in the feature dictionary, and to ensure consistency of data entries by use of the consistency matrix.

Figure 7:
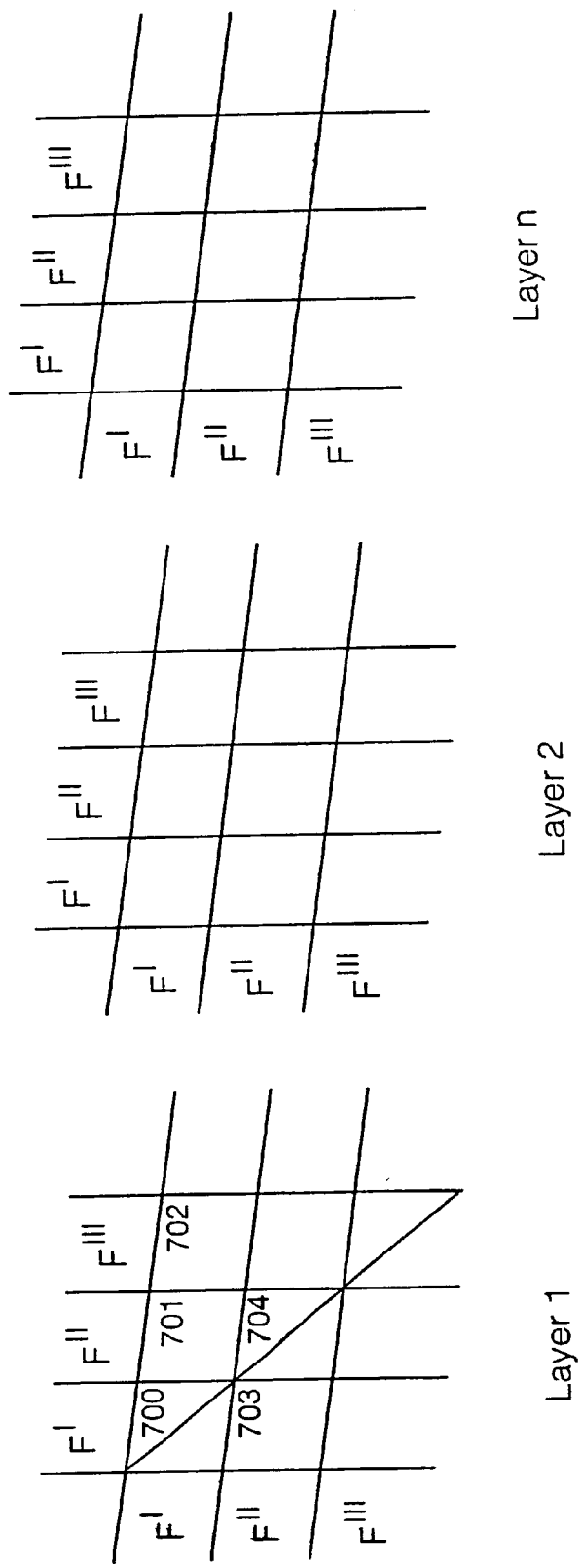
FIG. 7 illustrates schematically a consistency matrix.

Referring to FIG. 7 herein, there is illustrated schematically the consistency matrix. The consistency matrix comprises an n×n multi level data matrix which implements, amongst other things, an updated version of a square of opposition, to identify, inter alia, mutual exclusives and mutual dependencies between the set of knowledge statements.

Each layer of the consistency matrix addresses a different aspect of, inter alia, consistency or dependency within the set of knowledge statements contained in the feature dictionary.

The consistency matrix is one of the features of the specific implementation, which makes the process of building a correct and workable structure for the lattice and feature dictionary possible. Without the consistency matrix, the knowledge base could adopt a situation where not only is it possible to elicit inconsistencies and introduce them into the knowledge base, but in view of the tokenising nature of the knowledge acquisition process 310 such inconsistencies would be extremely difficult to identify.

The matrix allows for the elimination of the unintentional introduction of inconsistency but also allows for the identification of inconsistencies already extant within the domain knowledge—and thus the opportunity of their review and correction.

When all the knowledge statements comprising the feature dictionary have been elicited to the relevant level of granularity, that is, once all leaf-nodes have been reached, then the consistency matrix can be created.

The n×n multi-level consistency matrix implements the process of identifying, inter alia, mutual exclusivities, mutual dependencies, and a plurality of other logical relationships between individual knowledge data statements, including logical relationships which comprise updated versions of those identified within the square of opposition in order to ensure that complete internal consistency is provided within the knowledge base.

A square of opposition is one of the aspects which is implemented by use of the consistency matrix, and implements exclusivity, dependency, and a whole range of other logical relationships as will be understood by a person skilled in the art.

Without the consistency matrix, as the process of building the knowledge base is a tokenizing process, that is one where the person or machine building the knowledge base does not understand the knowledge domain, then inconstancies could otherwise be built into the structure of the knowledge base, which will be difficult to remove later, in the absence of a consistency matrix.

To complete the consistency matrix, once the elicitation of data has been carried out, and the feature dictionary is complete, there will be a number n of knowledge data statements within that feature dictionary. These features are aligned against each other as shown in FIG. 7, in rows and columns, to produce an n×n grid, in which each knowledge data statement is aligned against each other knowledge data statement. The grid is replicated multiple times, each grid representing a different layer of the multi-layer consistency matrix.

The type of data which is entered into the data entry positions 700–704 for each layer depend upon the particular layer of the consistency matrix to which they belong.

For example, if a facilitator was making a data entry at an X axis position F' representing a feature F' against a Y axis position F' then the facilitator would follow the process of asking whether there is any logically necessary or domain necessary connection between F' and F'. Since there is a connection between F' and F' (i.e. they are the same feature), that entry would be simply blacked out i.e. null data entered, indicated by the diagonal line in FIG. 7. Similarly for F''and F'''. This represents the state "true" in this tautology.

In this example, a first layer of the matrix represents relationships between each knowledge data statement and each other knowledge data statement of the feature dictionary, in terms of, when any knowledge data statement is selected, must any other data statements (or the same knowledge data statement) be true or false i.e. a true/false layer of the consistency matrix.

A next (second) layer of the connectivity matrix would represent relationships between individual knowledge data statements where for each knowledge data statement, assuming that knowledge data statement is true, what is the true/false state of each other (and the same) knowledge data statement i.e. what necessarily must be the state regarding a false/true function value.

The layers could be thought of as being logically equivalent to producing a set of IF THEN or IF WHEN statements encompassing all possible combinations of knowledge data statements within the feature dictionary.

The square of opposition is a prior art device which was developed in the middle-ages but which dropped out of use in modern logic as, unlike traditional logic, modern logic does not admit of the assumption that for each term (here roughly equivalent to a feature) that is used there is or was something to which that term relates; such that the relationships in a square of opposition do not then seem correctly stated. However, when concerned with the elicitation and representation of 'real world' expertise and domain knowledge the ideas behind and connected with the square of opposition become extremely powerful as the aforementioned assumption corresponds with the elicitation process seeking to identify all and only terms which have a correspondence with identifiable or evaluatable aspects of the 'real world' domain in question.

Referring to FIG., 8 herein, various modes of implementing the knowledge acquisition process are possible. However to implement the process there is required at least one human expert 800 or other knowledge source from which knowledge in a domain in which the expert is knowledgeable can be extracted, and at least one database 801 for storing the knowledge in a feature dictionary, lattice and consistency matrix as described above. In the best mode implementation, a human facilitator 802 assists the human expert 800 in delivering the knowledge into the database 801. Alternatively, a non-human source of knowledge, for example a book or electronic database, would replace the human expert. Whilst in the best mode implementation, the human facilitator is present, it will be understood by those skilled in the art that the expert 800, could alternatively enter knowledge directly into the database 801 without any intermediary humans being involved. Where present, the function of the human facilitator 802 is to make the knowledge extraction from the human expert 800 easier for the human expert or the computer, by guiding the human expert through the steps of the knowledge acquisition process, rather than leaving the human expert or the computer to determine his/her or its own way through the process steps.

The knowledge from the human expert is reduced to a set of feature statements, which are recorded in text and a set of connections stored in the connectivity lattice. In order to enter the text into the database, the text must be converted to electronic format, and in a fully optimized process human expert 800 would directly enter text statements into database 801 via a human user interface, for example a video monitor and keyboard, or voice dictation and voice recognition software. However, this would require the human expert 800 being able to operate the knowledge acquisition process, as well as yield knowledge, unless guided by the computer.

However, in practice, it may be time inefficient for the human expert to directly operate the knowledge acquisition process, and in practice, a human facilitator 802 having experience of the knowledge acquisition process may speed up the whole transfer of human knowledge of the expert into electronic data stored in database 801.

Alternatively, where the computer is programmed to prompt the human expert for knowledge, this may speed up the process of knowledge elicitation.

In the best mode the human facilitator 802 asks the human expert 800 a series of questions, where the questions are structured according to a set of rules for creation of the feature dictionary, lattice and consistency matrix. The human facilitator 802 asks or puts questions to the expert, using either voice and/or text, for example video conference, email or direct face to face meeting, and for each question asked, records text data. The text data must be recorded electronically in order to be input into the computer 801, but as another intermediate stage, may be recorded physically, for example on a sheet of paper, or in an intermediate form, for example on a voice dictating machine as audio data which may be typed up by an audio typist 803.

Where an intermediate form, for example paper or a voice dictating machine is used, this may be converted into electronic data before it is input into the computer. For example text may be scanned into a computer using a scanner and text reading program. Similarly, voice data may be passed through speech recognition software, in order to convert it into electronic text data before entering it into the knowledge base.

Whilst there are various different implementations of the knowledge acquisition process, and various modes of execution of this process involving different technical means, for example personal computers, dictating machines, telephones, voice conferences and email facilities, elements of the knowledge acquisition process include:

A human expert presenting voice and/or text statements in response to a set of questions.

A knowledge source yielding exception criteria when subject to a structured fasificationist analysis.

A set of analyses being presented to the human expert in a form which follows a set of rules, where questions are constructed on the basis of answers to previously given statements.

A set of rules being followed in order to create analyses, wherein the set of rules result in analyses, the information content of which is structured, so that the results received in response to the analyses may be directly placed within the feature dictionary and the lattice.

Input of results (knowledge) in electronically readable text format.

Storage of knowledge statements in an hierarchical connected manner according to a connectivity lattice, feature dictionary, and consistency matrix.

Figure 8:
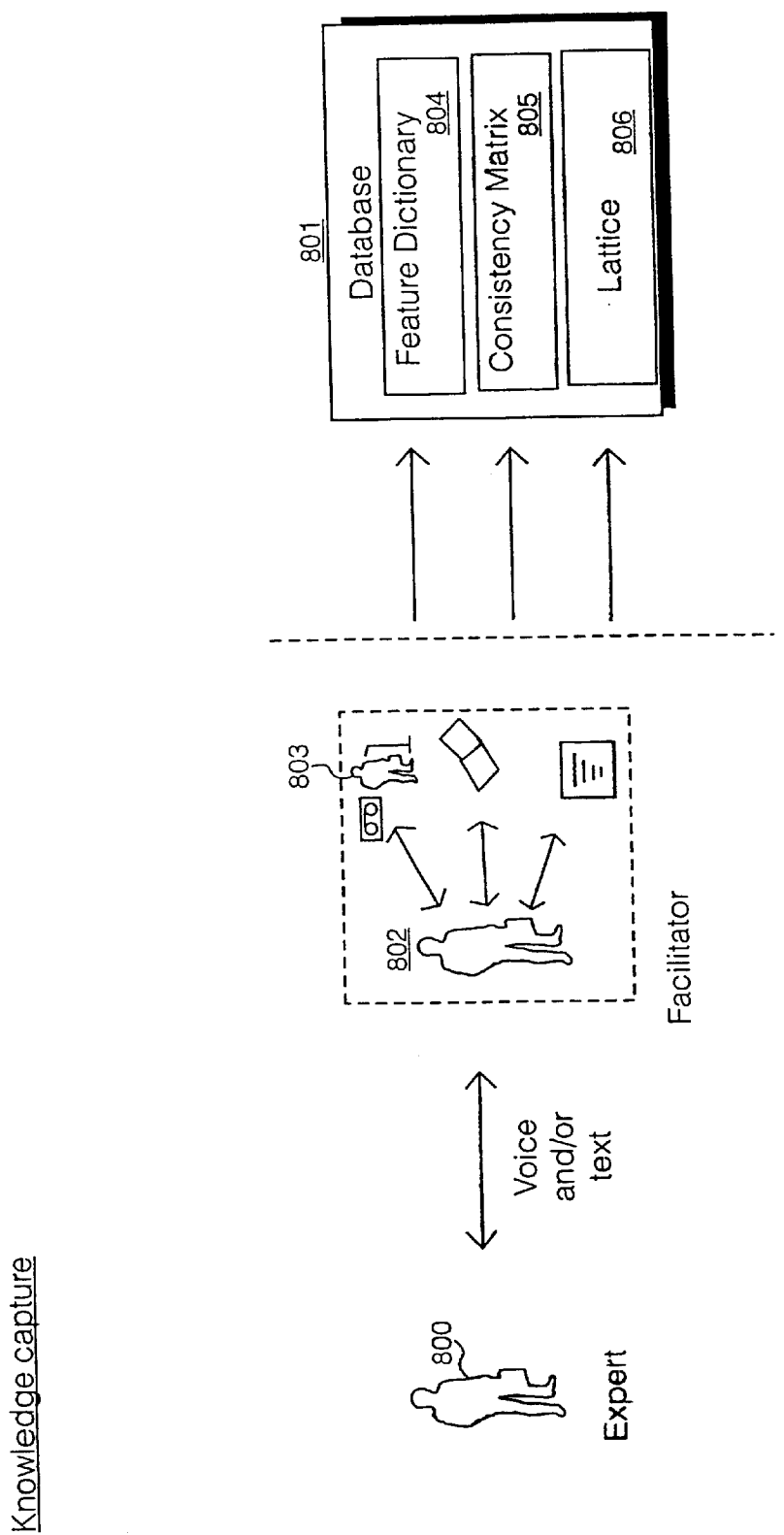
FIG. 8 illustrates schematically various modes of implementation of a knowledge acquisition process according to the present invention.

Referring to FIG. 8 herein, there is illustrated a basic set up of a knowledge base. Each knowledge base comprises a feature dictionary, a lattice and a consistency matrix.

Figure 9:
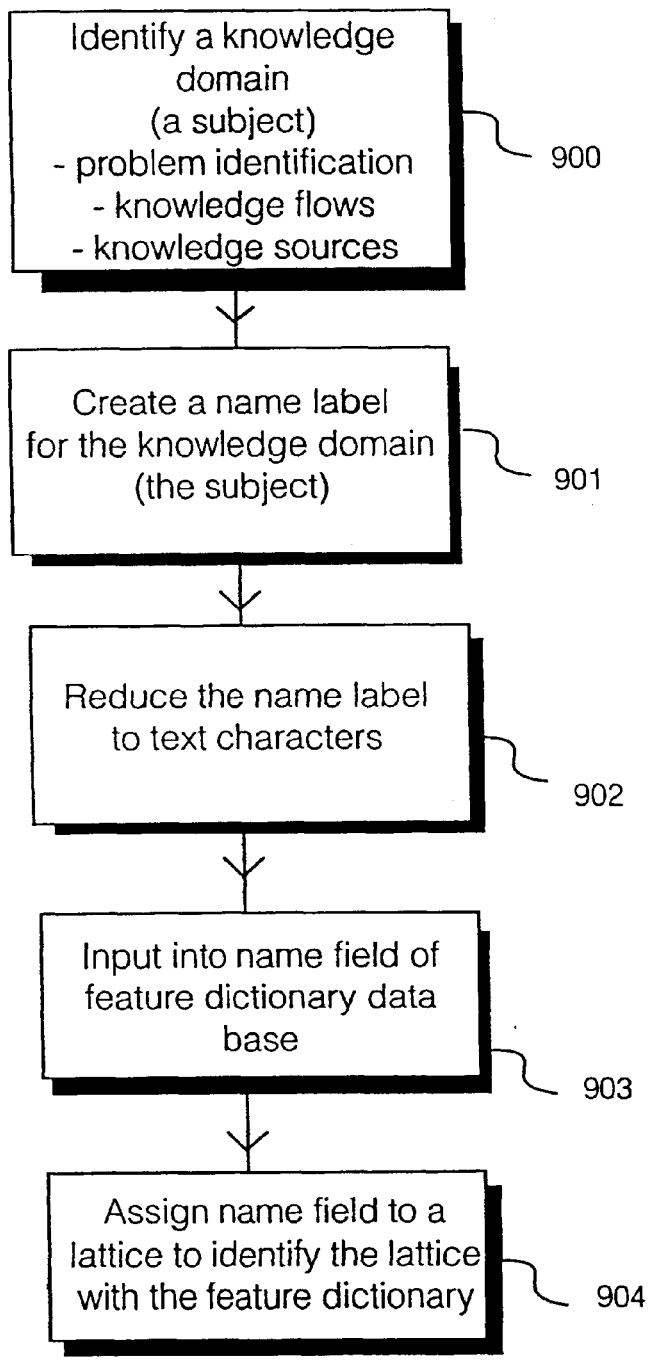
FIG. 9 illustrates schematically process steps carried out at the start of the knowledge acquisition process.

Referring to FIGS. 8 and 9 herein, process steps for the knowledge acquisition process 310 are now described. In process 900 there is identified a knowledge domain of a knowledge source, that is to say, a subject, field of technology, or art for which the knowledge source is established. This step may be human. For example, a human expert may agree that their domain of knowledge is rock climbing.

In process 901, a name label for the knowledge domain is created, and in process 902, the name label is reduced to computer readable text characters. For example in process 901 and 902, the human expert may decide that the name of their domain of knowledge is "Rock Climbing", which is entered as electronic name data in the form of ASCII characters into a name field of the feature dictionary in step 903. It is not essential that the text characters selected for the name bear any relationship to the knowledge domain. For example, in the knowledge domain of Rock Climbing, it is not essential that the words "Rock Climbing", which are descriptive of the knowledge domain of Rock Climbing, are selected. Alternatively, any other text character name could be used, for example "Tape Recorders", or "X Y Z 28.005". However, in order to avoid confusion it is preferable to select a name which has a descriptive element of the knowledge domain being addressed. In step 904 the selected text name entered into a name field of the feature dictionary is used to identify a connectivity lattice, such that the unique name label is common to and links the feature dictionary having the name "Rock Climbing" with a corresponding respective lattice.

The knowledge captured in the process of FIG. 9 may be recorded on paper, for example by filling forms in. However, that information is transferred into electronic database 801, by entry of that information in text format. The information is collected in a form which can be entered directly into the electronic database, so that, once collected, the data can be entered directly in text format without any further pre-processing.

Figure 10:
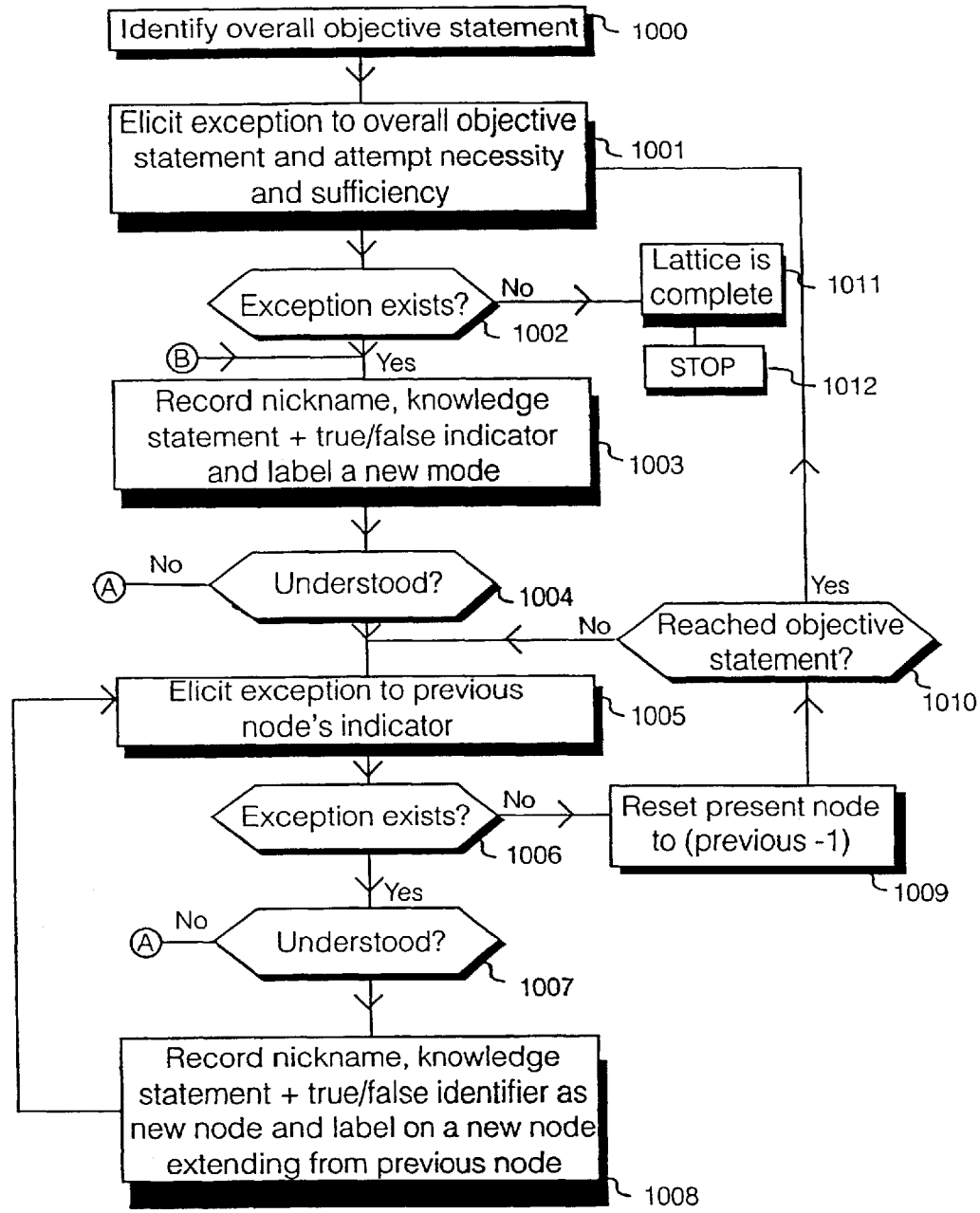
FIG. 10 illustrates schematically process steps carried out to elicit knowledge as part of the knowledge acquisition process.
Figure 10:
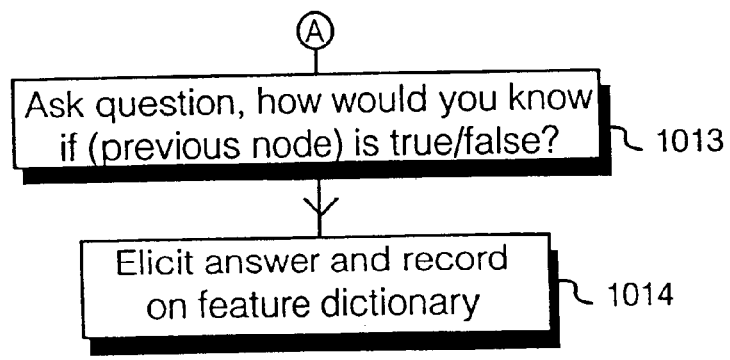

Referring to FIG. 10 herein, there is illustrated schematically an overview of the overall process steps for filling in the feature dictionary, connectivity lattice data and consistency matrix. In this example, the process involves a human expert being asked questions or having questions put to them. Firstly, there must be identified an overall objective statement, representing the primary purpose of the application of the knowledge. In process 1001, there is elicited an exception to the overall statement, by asking the expert whether any exceptions to the objective statement exist. If in step 1002, the expert answers in the affirmative, giving details of an exception to the objective statement, then in step 1003 the facilitator negotiates a nickname for that exception, records the details of the exception as a knowledge statement data entry, and determines a default value for the data entry. The data entry is entered according to the best mode on a node on the connectivity lattice, and as a line data entry in the feature dictionary, and the facilitator agrees a root value indicator for the new node. In process 1005, the facilitator then asks the expert whether there are any exceptions to the state produced on the objective statement by the most recently entered knowledge statement, i.e. that is to the most recently entered node. If an exception exists in step 1006, then the facilitator creates a new data entry, which is assigned to a new node, agrees a nickname for the new node, records the knowledge as a knowledge statement datum in text format together with its default value, and agrees a root value indicator for the new node. In the connectivity lattice, the new node, extends in a connection from the previous node. The most recently entered node now becomes the previous node, and the facilitator asks the question to the expert, whether there are any exceptions to the state which has just been recorded. The facilitator repeats step 1005. If an exception exists in step 1006, then step 1008 is repeated and the new knowledge is assigned a nickname, recorded as a knowledge data statement together with its default value, assigned a root value indicator, and labelled on a new node extending from the most recent node elicited. The process steps 1005–1008 continue until no more exceptions can be identified. During this process, the lattice grows in a first direction as a string of nodes. If in step 1006, a stage is reached where an exception to the previous node cannot be identified, then that terminates a line of growth of the lattice, and the previous node elicited is a terminating node, or leaf node. In process 1009, the facilitator then goes back to the penultimate node (previous node-1) and assesses in process 1010 whether the previous node is the objective statement or not. If not, then processes 1005–1008 are repeated. Whenever a new leaf node is reached, i.e. a node is reached beyond which no exception is identified in process 1005, then again, in process 1009, the facilitator goes back to the penultimate node before the leaf node, to elicit any alternative exceptions to the state produced on the objective statement by that node, growing the lattice in a new direction.

The loop 1005–1008 is repeated until all nodes and links of the lattice are exhausted, and each line of enquiry results in a leaf node to which no exceptions to the state produced by the objective statement can be identified. If in process 1010 the next node being considered has filtered up the lattice to the root of the lattice, i.e. the objective statement, then processes 1001 and 1002 are repeated. When all exceptions to the objective statement (root node) have been elicited and no more exist in process 1002, then the top level lattice is complete in step 1011 and the process stops in step 1012.

At this stage, there should be a full lattice connection, and full feature dictionary comprising a plurality of data entries.

Once the lattice is complete, if a knowledge statement had not been understood in steps 1004 or 1007, then in process 1013 the facilitator asks a different question, of the form "How would you determine a value for the previous node?".

This form of question is posed in order to obtain an evaluation mechanism for a node, potentially leading to a sub lattice as described in FIG. 6 herein. The sub lattice is elicited in processes 1001–1012 as previously described, but with the overall objective statement referred to in step 1001 being replaced by the knowledge statement on the node. The sub lattice therefore grows in a different dimension to the higher-level lattice to which it connects.

The nature of the lattice is multi-dimensional. If a node is not understood, leading to a sub lattice, there may be another node within the sub lattice which is also not understood. This other node may in turn lead to another sub lattice. This can go on with no theoretical limit to the number of sub lattices which can be nested in different orthogonal dimensions within a single node of the connectivity lattice, leading to a multi-dimensional connectivity lattice.

Further details of the overall process of FIG. 10 will now be described.

Figure 11:
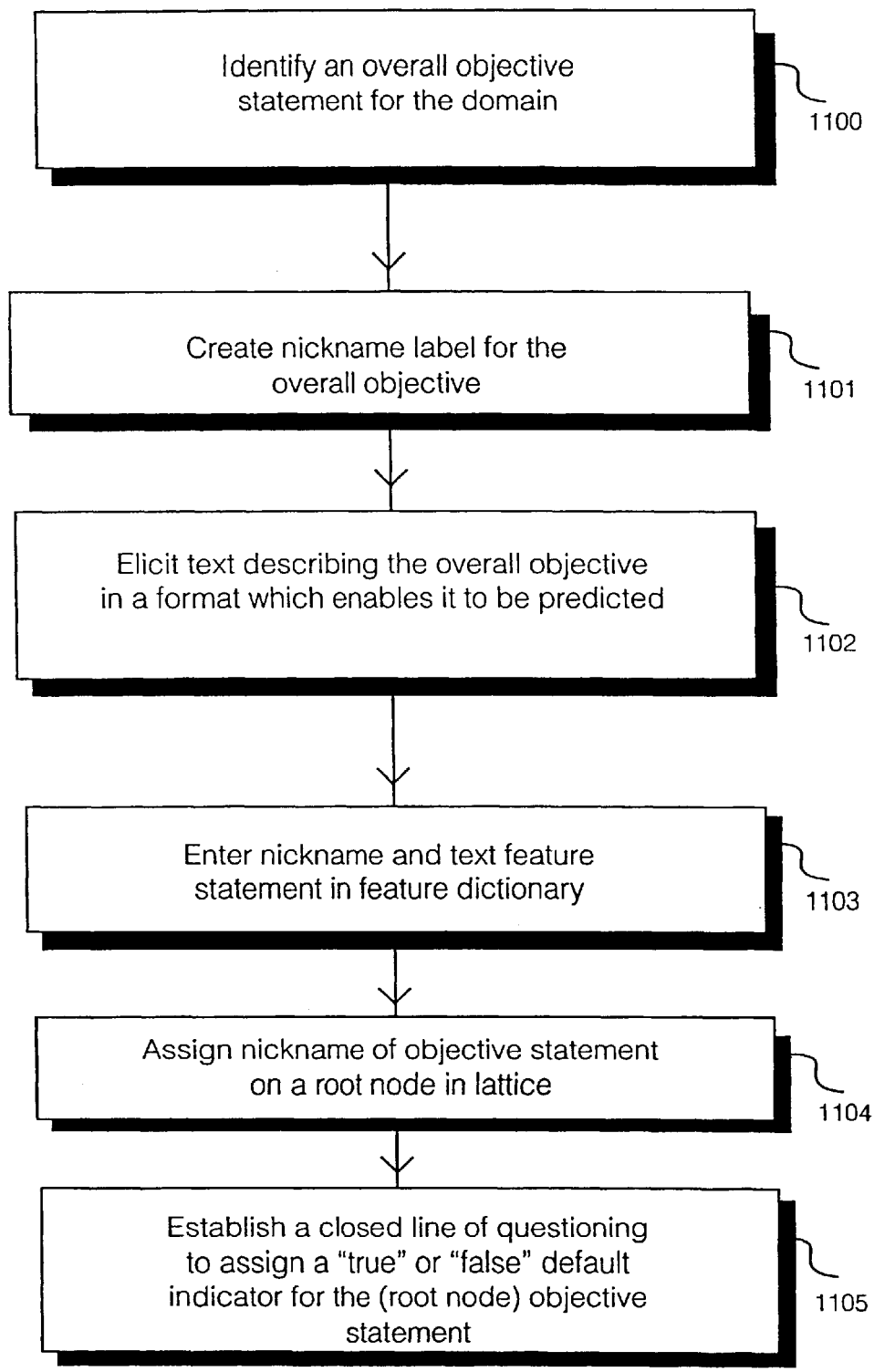
FIGS. 11 and 12 illustrate schematically further steps carried out for knowledge acquisition as part of the knowledge acquisition process.

Referring to FIG. 11 herein, there is illustrated schematically process steps carried out to establish a root node of a lattice illustrated in FIG. 5, following general process steps according to the specific knowledge acquisition process described herein. In step 1100, there is identified an overall objective statement for the knowledge domain. This may be identified either by the human expert themselves or may be suggested by a human facilitator or be determined by an analysis of a knowledge source. The overall objective statement must be a statement which can be shown to have a default value. The best method is for this statement to be Boolean in nature.

In order to obtain the overall objective statement, the expert should be prompted to give an overall high level description as to what the expert is trying to achieve when the expert applies their expertise within the knowledge domain. In other words, to elicit the ultimate problem the expert is trying to resolve.

For example, in the field of rock climbing, an important consideration is whether a rock climber will or will not fall off a rock face which she is climbing. On the assumption that there is an ever-present risk of falling off a rock face, it is known to provide protection, in the form of various ropes and attachments for protection against falling off. Therefore, a suitable objective statement for the domain of rock climbing would be, as shown in FIG. 4, the statement "you have acceptably safe protection from falling from the rock". In this instance the overall objective statement can have either of two values, being either true or false, and an objective of the knowledge acquisition process is to gain enough knowledge from the human expert or other knowledge source such that a computer can apply the knowledge to determine, using a series of questions presented to a third party in a knowledge application process described later on herein, whether an acceptably safe level of protection from falling off a rock can be considered to exist or not in a particular instance.

In process 1101, there is created a nickname label for the overall objective defined by the objective statement. In process 1103, the nickname and the text describing the objective statement is entered as a feature statement in the feature dictionary 400. In process 1104, the nickname, in this case "suitable protection" for the overall objective is assigned as a root node in the lattice shown in FIG. 5.

In process 1105, there is assigned a value, in this case a default "true" or default "false" indicator to the objective statement. That is, in the present example it is assumed that in the absence of consideration, acceptably safe protection from falling from a rock is not provided. Where Boolean, the true or false indicator can be assigned by first establishing a closed line of questioning to the expert, to find out from the expert whether the most common condition, in the absence of any other factors, is that the objective statement is true or false.

In steps 1100–1105, there may be solved a basic problem of knowledge elicitation from a human expert, in converting a knowledge item of a human expert into computer readable data. The computer, being an unnatural entity, initially has no knowledge of rock climbing, but sees the name label "Rock Climbing" as digital data having information content, but not in a computable form. The computer therefore has no notion of the concept of falling off a rock being an important aspect of the knowledge.

However, by constructing a question according to a genuine falsificationist epistemology, that is a question, the answer to which is to be shown to hold a default value, in this case either true or false, as an overall expression of an objective statement, the intuitive knowledge of a human expert or implicit knowledge contained in another knowledge source, which other humans may consider to be so obvious that it would not even be mentioned (and therefore, in prior art systems not be entered into the computer), is elicited in the present specific method, and therefore can be entered into the knowledge database.

The structure and format of:
the investigation/analysis procedure carried out and
the data records which are recorded
are fundamentally driven by mathematical algorithms, so that there is a mathematical approach and a mathematical formula underlying the questions which are presented to the human expert, and the structure of the responses which are recorded.

The investigational analysis procedure drives the human expert or other knowledge source to reveal their expertise in a particular knowledge domain in a manner which has a one to one correspondence with an underlying logical or mathematical form. The investigational analysis procedure has several unique aspects to it which give benefits in solving the knowledge elicitation bottleneck. These include the following:

The human facilitator does not need to have any knowledge about the knowledge domain which is being elicited from the expert and entered into the database, because the questions being presented to the human expert are not guided by what conventional wisdom would suggest should be asked.

The process follows a mathematical routine to construct investigations where the routine followed is independent of the knowledge domain.

Neither the facilitator nor the knowledge source needs to have any knowledge of the underlying mathematics of the knowledge elicitation process, but merely needs to follow a set of rules defining an investigation sequence, which is determined as a result of the underlying mathematics, and falsificationist philosophy.

Figure 12:
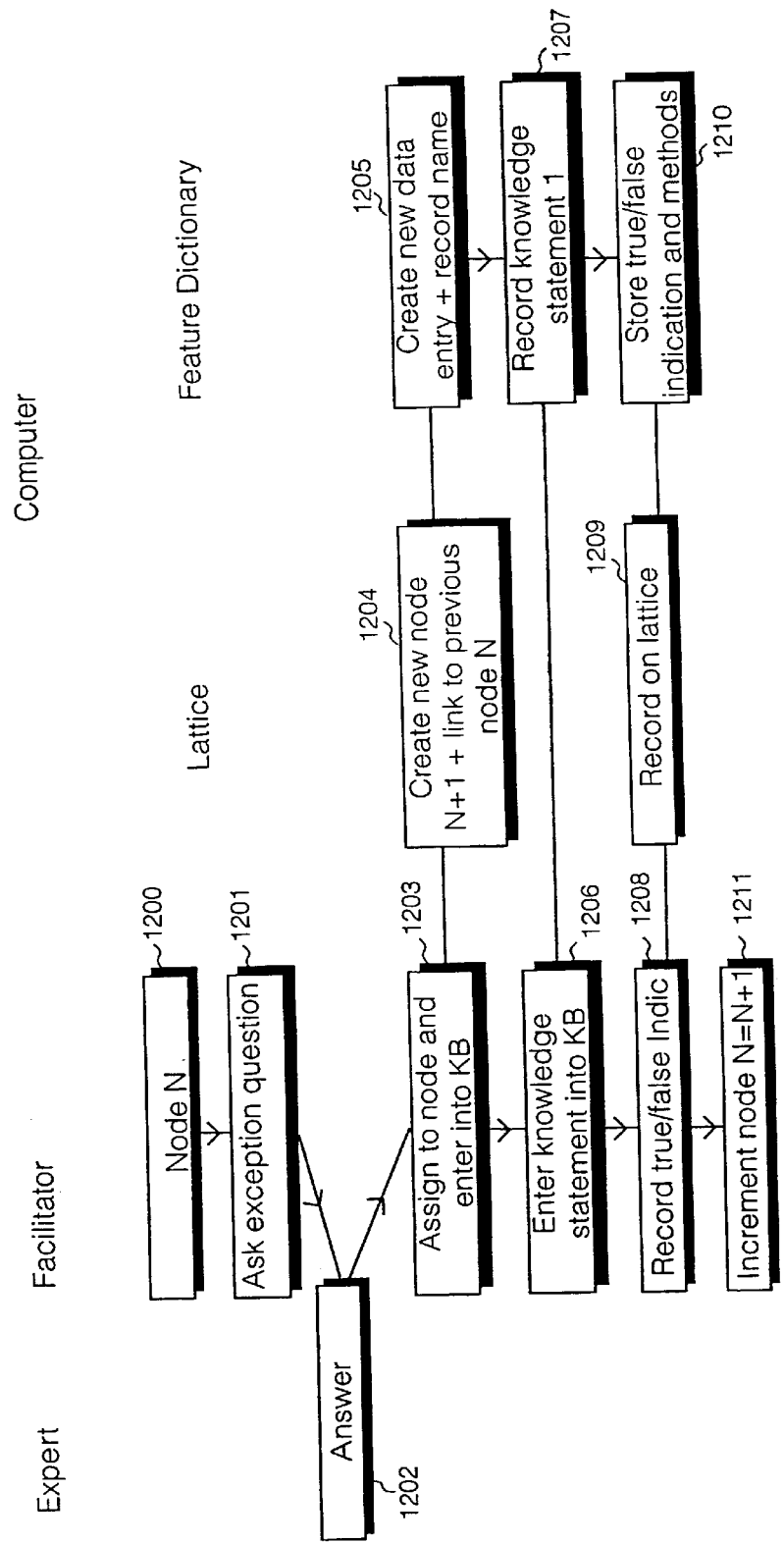

Referring to FIG. 12 herein, there is illustrated schematically actions carried out by the expert, facilitator, and a computer for entering data into the knowledge base. These processes are carried out every time a data entry and lattice node is entered. In step 1200 a new node n is selected by the facilitator and in step 1201, the facilitator asks the exception question, seeking an exception to the effect on the objective statement given by the knowledge statement on the node n.

In process 1202, the expert answers the exception question. If an affirmative answer is received, i.e. there is an exception, then in process 1203, the facilitator assigns a nickname to the answer and (after optionally recording that nickname on paper) enters the nickname into the computer. A new node is created in step 1204 in an electronic representation of the lattice, and in step 1205, a new data entry is created in the feature dictionary. In process 1206, the facilitator types in a text statement (knowledge statement data) into the computer, which is recorded in the created data entry in process 1207 by the computer along with a default value. In process 1208, the facilitator records a root value indicator (in this case a true/false indicator) along with the node itself which is recorded on the lattice in process 1209. A default value and method(s) for the knowledge statement are entered in the feature dictionary in process 1210. In process 1211, the facilitator increments the node to n=n+1. The process then repeats from step 1200 down to 1211 again for the next node.

It is possible that an affirmative answer in step 1202 will give rise to a knowledge statement which has already been entered into the feature dictionary. Under these circumstances a new knowledge statement is not created, and is instead the existing one is used on the lattice. Therefore only step 1204 (creating a new node), step 1208 (recording the root value indicator), step 1209 (labeling the new node on the lattice with the existing knowledge statement) and step 1211 (incrementing the node) are performed.

During this process, the lattice and feature dictionary build up, to create a potentially complex multi-dimensional lattice, a feature dictionary, and a consistency matrix.

There will now be described with reference to FIGS. 5 and 6, an example of a practical knowledge elicitation process, where the subject (knowledge domain) comprises rock climbing. It will be understood by those skilled in the art, that this example is one mode of operation of the knowledge acquisition process, involving a human facilitator, recording the data entries and node entries into a lattice, either on paper, to be later entered into a computer, or directly into a computer. A facilitator assists a human expert to construct a knowledge base in the knowledge domain of rock climbing. The knowledge base can then be used by novice rock climbers, to determine whether they have suitable protection from falling. The facilitator fills in a feature dictionary having an architecture as described with reference to FIG. 4 herein, and a connectivity lattice as hereinbefore described, which describes how the knowledge statements are interconnected in the expert's decision making process. The process begins by asking an expert for a very general high level explanation of what it is the expert is trying to do, when the expert is applying their expertise in the knowledge domain. In other words, what is the problem which the expertise is seeking to resolve? For example, such a question may be formulated as "What is your ultimate goal when you are offering your advice?" In this example, the expert may respond "I am trying to determine whether a rock climber has suitable protection from falling from a rock face". The facilitator tokenizes this item of knowledge, and gives it a nickname. The facilitator explains to the expert that a nickname is being given to that item of knowledge. For example the facilitator may say "I intend to call that objective 'suitable protection'". This is recorded as a data entry in the feature dictionary, that is recording the nickname, and a text description of the knowledge, in the form of a knowledge statement data. The data entry "suitable protection" gets placed on the lattice on the root node, as the objective statement. However, the data entry is not quite completed yet, since it must be determined what the default value of the objective statement is (in this example, true or false). A closed line of questioning needs to be established. At this stage, there is only recorded a node with a token nickname and knowledge data statement. The information has no value attributable to it. There is an unpredicated token, but no value for that knowledge. The expert may respond "It is a safety critical area, so therefore we assume as a default condition that there is insufficient protection". This gives the true/false indicator, which is referred to herein as the "root value indicator", which in this case is filled in as negative. This means, if there is no further information on the situation obtainable, then you should assume that the objective statement "suitable protection" is false.

Now, there is established a closed line of questioning, because there is a default value attached to the feature, i.e. the quality of being false.

Next, the lattice must be extended through a series of iterative questions, exploring each exception to the objective statement's default condition of false. The facilitator will construct a question such as "What is the first thing that might lead you to think that you did have suitable protection?" The facilitator seeks to find a condition which falsifies the objective statement. The expert may respond "Well if a hex fits then there would be suitable protection". The facilitator records this as a data entry in the feature dictionary, and gives it a nickname, for example "hex fits". The facilitator should inform the expert that "I am going to call that feature hex fits". The facilitator does not need to have any knowledge about what a hex is or what the significance of a hex fitting is in order to complete the data entry. A true root value indicator is then assigned to this new "hex fits" node. Therefore, the sum knowledge at this point is that suitable protection can be assumed not to occur, unless a hex fits, in which case there is suitable protection. The positive indicator relates not to the information about whether the hex fits or not, but is a root value indicator about the objective statement i.e. whether there is suitable protection or not. Therefore, the rules elicited so far are (i) if hex fits is true, then "suitable protection is true" and (ii) if hex fits is false, then the hex fits root value indicator is not allowed to be used, in which case the default condition is "suitable protection is false".

It then has to be established whether there is another sub network sitting behind the "hex fits" node on the lattice. This is done by finding out whether or not end users of the knowledge base can understand the question "hex fits?" or whether further analysis is required. On a data entry of the feature dictionary, there is recorded a tick or a cross depending upon whether the expert considers that further analysis will be required. This allows the facilitator to come back to that node to elicit further information, after completing the top level lattice.

The remainder of the process is an iteration of the above process. Each node is selected, and questions are asked to see if there are any exceptions to the knowledge as regards the objective statement produced by that node. If so, each of the responses constitute a separate data entry in the feature dictionary, until leaf nodes on the lattice are found where there are no exceptions to those nodes. When all nodes have been investigated, such that there are no remaining nodes which have exceptions, then the lattice is complete, except for nodes which require explanation and give rise to sub networks.

Therefore, the three basic steps in the process include:

Present the current situation and find out if there are any exceptions.

If there is an exception, ask whether that exception is sufficient to overturn the previous belief statement (node). If it is not sufficient then it will be necessary to elicit further knowledge data statements and place them on connected nodes on the lattice, with the objective of producing enough of these nodes, each of which is a logically necessary condition within the knowledge domain, such that a concatenation thereof forms a sufficiency of information to produce an exception.

Find out whether there is a sub network leading off a node.

The above steps must be applied to every node in the lattice. In the case of the "hex fits" node, these three processes are exemplified by the question:

"Given that a hex fits, what is the first thing you would look for to make you think that you were not suitably protected".

This is an attempt to overturn the hex fits—true node. The expert may say "If the rock is friable".

The knowledge "If the rock is friable, then even if a hex fits, there is not suitable protection" is recorded as a data entry, with the nickname "rock friable" and is assigned a negative root value indicator because the "rock friable" knowledge overturns the "hex fits" knowledge, which overturns the default state "suitable protection" false, meaning the overall result is that suitable protection is again false.

The facilitator needs to establish whether there are any exceptions the state produced on the objective statement by the knowledge that a hex fits but the rock is friable.

The facilitator then further explores the hex fits node, to see if there are any further exceptions to the state produced on the objective statement. In this case, if the rope was over an acute angle, then that is an exception which overturns the hex fits root value indicator. That is, if the hex fits, but the rope goes over an acute angle, then the suitable protection is still not available. The data entry nicknamed "acute angle" is entered in the feature dictionary, the facilitator asks about the default status of this knowledge statement and then asks whether a further expansion will be required by the user, to which the expert in this example, responds "No".

The facilitator then examines whether there is a third layer of nodes hanging off the "acute angle" node, by asking "What is the first thing you would look for to determine that you have suitable protection if a hex fits, but the rope goes over an acute angle?" The expert may respond "If the climber is doing a difficult move, then that would be an exception". The facilitator then enters this as a knowledge statement in a data entry nicknamed "difficult move" on the feature dictionary and assigns a positive root value indicator to it.

The facilitator must then ascertain if "difficult move", a necessary condition, is also sufficient to produce an exception on its own, or if any further issues (i.e. knowledge data statements and lattice nodes) need to be considered in conjunction with it in order to produce that exception.

The facilitator then establishes with the expert that doing a difficult move is by default either of a true or false type and there are no exceptions, and then further examines other exceptions to the acute angle node. For example the facilitator might ask "Are there are other exceptions other than a difficult move, which would lead you to overturn your previous advice about acute angle?" The expert may then say "Yes, if a wired hex in pristine condition is being used, then even if the rope is at an acute angle, and the hex fits, then there will be suitable protection". This data entry is assigned a positive root value indicator on its node in the lattice (for if it and all the nodes between it and the objective statement are true then this indicates that the objective statement itself is therefore true) and the knowledge statement's default value is recorded in the feature dictionary.

For the node "hex fits" the rules elicited are 1) "If hex fits and rock friable, suitable protection is false, and 2) if hex fits and acute angle, then suitable protection is false".

The facilitator continues to explore the lattice, making sure that no nodes are missed, and all nodes are fully explored for exceptions to the state produced on the root node. The lattice may grow in a depth first, breadth second order.

The depth followed by breadth order is significant, because that is the order in which the expert has ordered the knowledge items in importance. In other words, the subconscious ordering of importance of information is reflected in the structure of the lattice. In other words, the tacit knowledge of the expert has been elicited in a manner which would not occur with prior art methods. Further, items such as the friability of the rock may be items which the expert would not have consciously thought about in prior art knowledge elicitation methods. However, this knowledge is extracted by using a closed line of questioning to overturn a previous node's effect on the root node, in a present method. Also, each path constitutes a hypothetical route in the domain. The process proceeding depth first mines each path to its current limit before attempting to construct other hypothetical routes through the knowledge domain.

Using prior art knowledge elicitation methods, rare conditions and circumstances, are very often not elicited. However, in the presently disclosed method, because lines of questioning are closed, and the experts knowledge domain is explored, following the lattice, in an ordered manner, a more complete knowledge is elicited from an expert.

For example, in a safety critical application, such as a knowledge based system directed at a chemical plant, all of the conditions which could conceivably give rise to the chemical plant exploding must be elicited from an expert. Under these circumstances full knowledge elicitation is critical to avoid a knowledge based system having incomplete knowledge and conditions occurring which may give rise to an explosion, being outside a domain of knowledge stored by the knowledge based system. Use of the rules and lattice structure according to the present specific implementation enable a complete knowledge elicitation of the available knowledge sources within a knowledge domain to be obtained.

The facilitator attempts to construct the lattice by identifying nodes depth first, that is looking for conditions which overturn the objective statement, and then going back to identify nodes in a width dimension, seeking every exception to a node, noting which nodes require further explanation (sub lattices) during this process. Finally, the facilitator explores each node which requires further explanation, to derive each sub lattice, to build up a multi dimensional hierarchical tree-structured lattice network, having as its root node the objective statement, having as leaves knowledge statements to which there no further exceptions to the belief state produced on the root, and having as a plurality of intermediate nodes knowledge statements which are singly or in conjunction with other nodes produce exceptions to the belief state.

Specific methods and implementations disclosed herein may enable the extraction of human decision making capability from human individuals, and its translation directly into computer readable data in a form which is immediately computable without any pre processing, and without any manipulation into a predetermined format suitable for entry into a predetermined data base architecture being necessary.

The collected computer readable data, once transferred into a conventional knowledge based computer system can provide explanations reasoned to a degree of sophistication which is not available with prior art knowledge elicitation methods. Further, the collected data can provide an audit trail of an interaction with one or more knowledge sources at the data elicitation stage, so that the source of any output of an expert system given on the basis of the collected data can be traced back to the individual knowledge source, who was the source of the rule or knowledge, upon which the expert system output was based.

Figure 13:
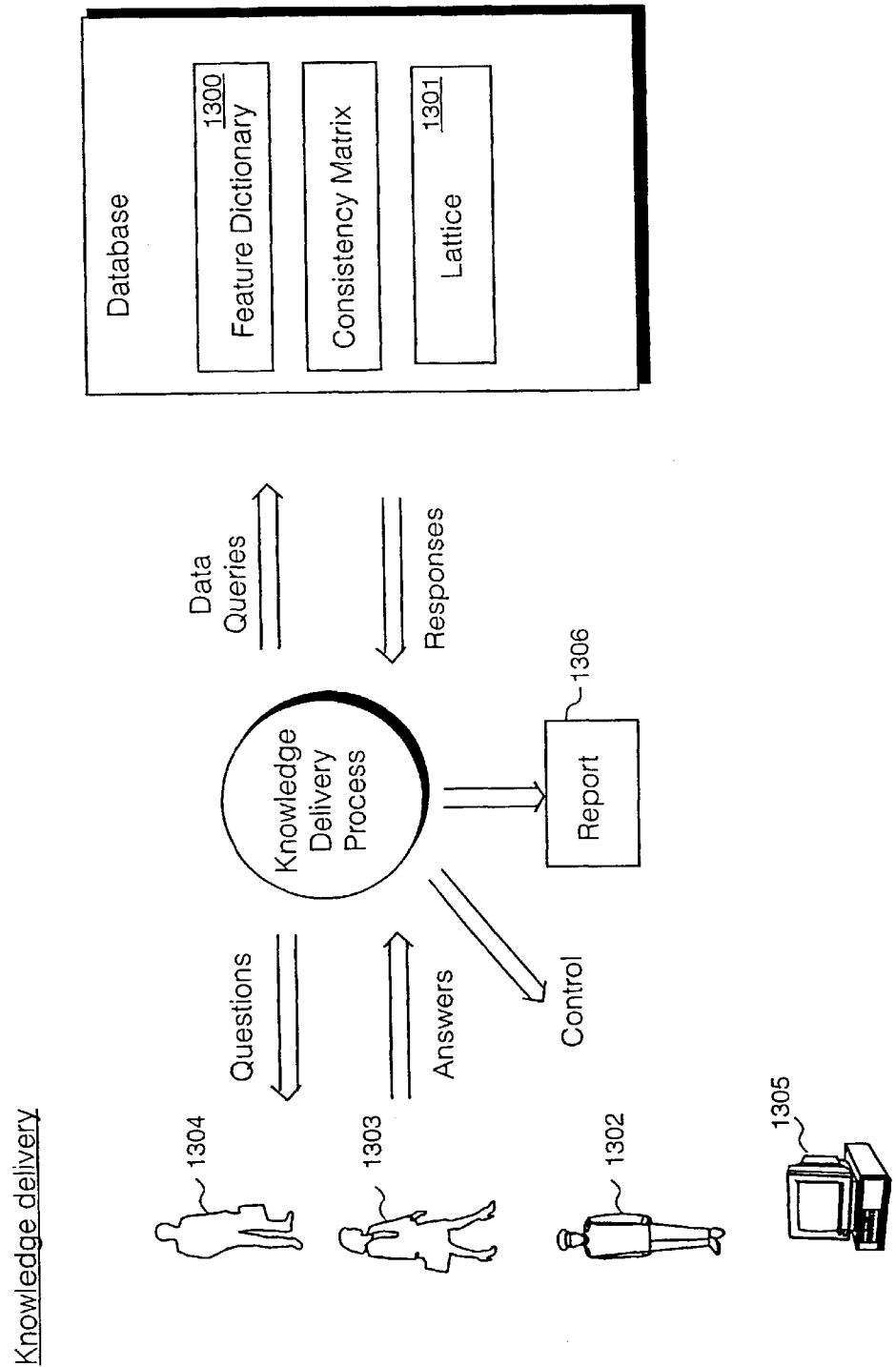
FIG. 13 illustrates schematically a knowledge delivery process according to a specific implementation of the present invention.

Referring to FIG. 13 herein, there is illustrated schematically a knowledge delivery process, for delivering knowledge and advice from a knowledge base comprising a feature dictionary 1300 and lattice 1301 to one or a plurality of individuals 1302–1304. The knowledge can be delivered in the form of a report 1306, which can be printed or delivered in electronic text data format. Alternatively, an automated control action may result as an output of the knowledge base. The knowledge delivery process may be carried out by a human facilitator in the best mode. However, in the general case, it is not essential that a human facilitator is involved in the process. A human or machine addressee may interrogate the knowledge base directly.

Figure 14:
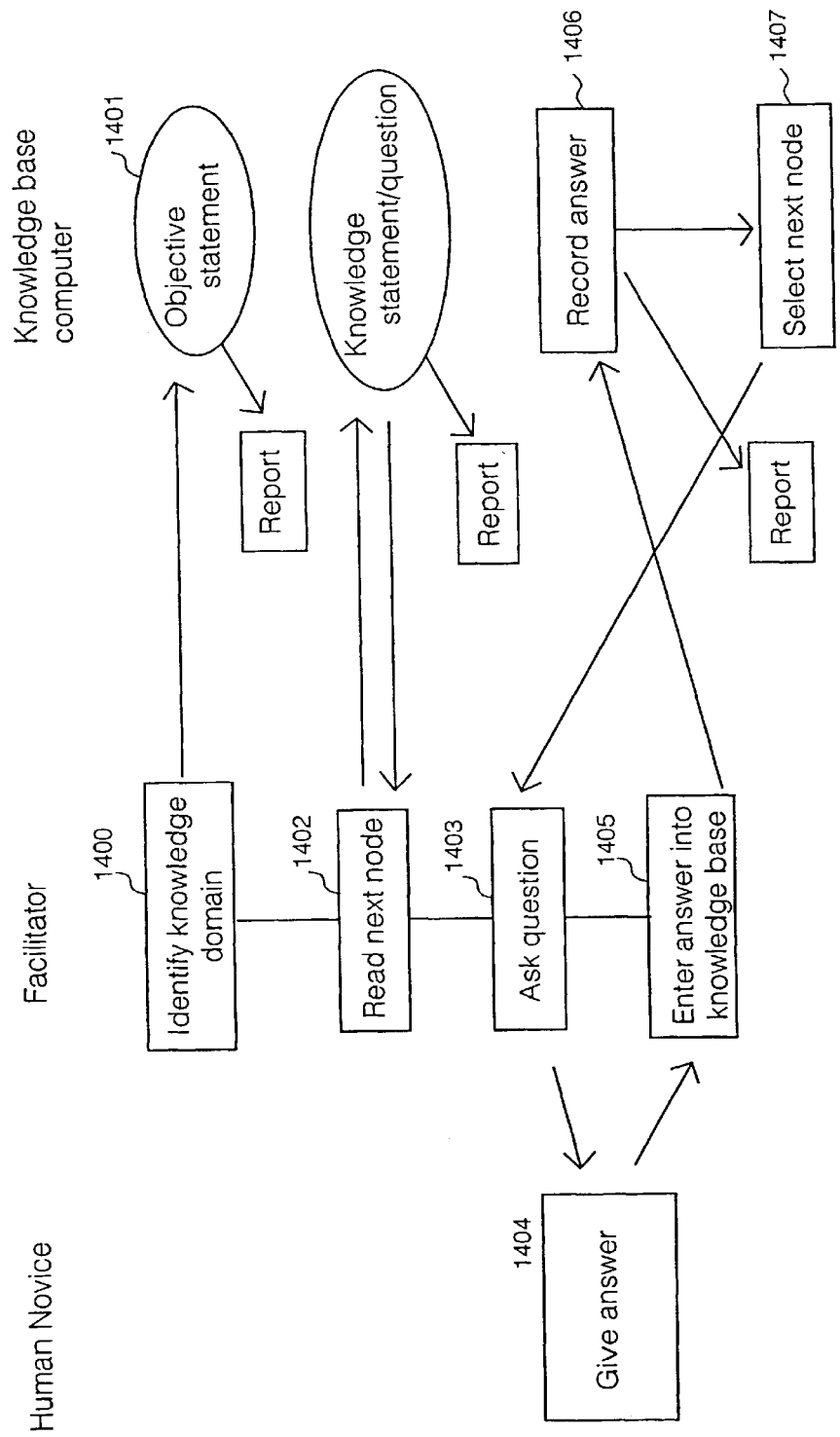
FIG. 14 illustrates schematically process steps of the knowledge delivery process.

Referring to FIG. 14 herein, there is illustrated schematically process steps carried out in the knowledge delivery process. In this example, a human facilitator is involved, although in the general case need not be present. In process 1400, the facilitator identifies a knowledge domain in which the addressee is interested. For example, in this case rock climbing. The facilitator then selects a knowledge base having the correct knowledge content on a computer stored in the knowledge base. This results in the feature dictionary and lattice for that knowledge domain being selected. Where in a knowledge delivery mode, the computer containing the knowledge base selects an objective statement in process 1401, allocates memory to store a report in process 1402. The objective statement is stored in the report. The facilitator may recite the objective statement to the addressee, in this case, that the objective is to find out whether the addressee rock climber has suitable protection. In process 1403, the computer generates a display of a knowledge statement underlying the next node in sequence, where the sequence is determined by the structure of the lattice. For example, in this case the computer displays the question "Does a hex fit". The facilitator then reads this question and asks the question to the human addressee in process 1403. The human addressee gives a Yes/No answer in process 1404. If the human addressee is unable to give a Yes/No answer, because they do not understand the question, then the facilitator can select from the computer the underlying sub network behind the node "hex fits" as illustrated in FIG. 6 herein. If that is the case, then there is displayed on the computer the next question "Is the crack between 2 cm and 8 cm in width?" The addressee gives an answer which is stored in the knowledge base, and also written to the report by the computer in process 1405 and 1406. In this example the user gives the 'Yes', whereupon the computer then automatically displays the next question corresponding to the next node in the sub network, in this case the node nicknamed "appropriate depth" in process 1407. (If the answer had been 'no' then the computer searches for a node at the same level as the current node but to its right (i.e. a sibling node). If there is one, it continues from step 1403 with that node as its new focus. If there isn't one it goes up another level in the lattice hierarchy and performs the same test for a sibling node. Repeated absence of sibling nodes will cause the computer eventually to track back up to the objective statement.)

The facilitator then asks the question corresponding to the knowledge statement of the current node, in this case "Is the crack between 2 cm and 8 cm deep?". The human addressee then gives the answer 'Yes' in process 1404 which is entered into the knowledge base and recorded in processes 1405, 1406. Again, in process 1407 the computer selects the next node in the sub tree, in this case the node nicknamed "flares". The question corresponding to the knowledge statement is displayed, in this case "Does the crack flare towards the back?" The addressee gives the answer 'Yes' which is entered into the knowledge base and recorded into the report in processes 1405, 1406. Because the node "flares" leads to three other nodes, the computer then selects each of those other nodes, in the order in which they were originally entered into the computer, which represents the order of importance given to those nodes by the expert during the knowledge acquisition process. In this case, the first node nicknamed "terminate" is selected and the underlying knowledge statement "Does the crack terminate?" is displayed on the computer. The facilitator asks this question to the human novice who gives an answer, in this case "Yes" which is entered into the computer by the facilitator and recorded in a report output as before. Subsequent questions are displayed corresponding to the nodes "taper" and "spike" resulting in the corresponding respective knowledge statement "Does the crack taper in the vertical?", and "Is there is a spike or protrusion from the rock?". Answers ("No" in both cases) are entered into the computer as previously.

This completes investigation of the sub network behind the node "hex fits" and the "terminate", "taper", and "spike" nodes on the sub lattice all lead back to the "hex fits" node.

As the node "hex fits" has been found to be true by virtue of the evaluation of its sub lattice, the process continues by the computer selecting the next node in the lattice, in this case the node having the nickname "rock friable". The underlying knowledge statement "Is the rock friable?" is displayed, the question posed to the addressee and the addressee gives an answer, in this case "Yes". The computer then goes onto the next node, which is selected in the order in which the lattice tree was constructed, in this case the node having the nickname "acute angle". The underlying knowledge statement "Is the rope going over the extender at an acute angle (less than 60°)?" is displayed and presented to the addressee by the facilitator. The answer "Yes" is given by the human addressee which is entered into the computer. Next on the two nodes at a layer below the "acute angle" node are investigated, being selected automatically by the computer in the order of importance. These nodes, named "difficult move" and "wired hex" give rise to the corresponding displayed knowledge statement "Are you performing a difficult move or resting?" to which the answer is "Yes" and "Are you using a wired hex in pristine condition?" to which the answer is "No".

This completes investigation of the left hand portion of the lattice as shown in FIG. 5. The computer then proceeds to select the next node in sequence, which in this case, is the node nicknamed "wire" and proceeds to display the underlying knowledge statements and accept answers and print the knowledge statements and answers to a report, as described in processed 1403–1407, until the whole of the lattice tree has been explored and complete information has been obtained from the addressee.

Referring to FIG. 15 herein, there is illustrated schematically part of a report presented in electronic format by the computer with respect to the foregoing example; this is as an example of one possible output of the knowledge base. The report comprises:

- an interaction trace report 1500, comprising a list of the knowledge statement questions which were asked to the addressee, along with the answers to those questions which were input to the computer, listed in the order in which those questions were asked and answers input;
- a report trace 1501, giving text advice, and a reason for the advice;
- a current report 1502 containing an overall advice text; or, where the knowledge base is operating an automated system, a control signal may be generated; and
- an explanation report 1503 comprising a text result of the evaluation, an explanation of the evaluation result, listing returns from each of the sub trees within the lattice, and tracing individual paths within those sub trees; and
- a method explanation section, explaining how each node was evaluated, that is in this example, the question asked and the answer given corresponding to each node.

-39-

Appendix

Translating lattices into rules

The following relates to one specific method of implementation of the invention only.

The formal semantics of the knowledge acquisition process, in particular how to translate lattices into rules is as follows. The lattice represents a multidimensional representation of a domain of knowledge. The lattice represents a fundamental construct of a unique and powerful non-monotonic logic. The lattice is constructed by elicitation of knowledge from human individuals or knowledge sources, where the elicitation technique is by exception. That is, human experts are analysed as to whether there are any exceptions to a prior piece of knowledge which they have already elicited or identified.

Furthermore, there is a mathematically proven correct algorithm for translating between the statements of lattice logic and statements of propositional logic or first order predicate calculus. Propositional logic or first order predicate calculus will be known by those skilled in the art of mathematics and philosophy. The following disclosure is not intended to be strictly formal, but simply to give a statement of the logic in terms which are clear to the person skilled in the art.

The semantics of a lattice node

A lattice node returns its root value indicator if, and only if, it and all nodes above it on a lattice on a direct path back to the root (but not including the root itself) refer to features which are true, and all the nodes immediately below it refer to feature which are false, by analysis or default.

Such a node is termed herein a *"sticking node"* or a *"holding node"* because, following down a lattice and visiting only true nodes, a sticking node is reached, but the lattice cannot be followed any further without encountering false statements.

When a holding or sticking node is found, the feature of a root node, that is the feature which the lattice is "for" should take the value of the root value indicator of x.

This can be more formally expressed as a characteristic formula as follows:

Characteristic Formula

Let a be a function which returns the advice of a node. Let f be a function which returns the feature of a node.

The characteristic formula of a node x (ignoring quantifiers) is:

$$(((v(p)=[x] \; U \!\!-\!\!\!> \; v(q)=t[p:x/x']) \; U \!\!-\!\!\!> \; v(r)=t[p:\; x'/x''])...)$$

– where 'v' represents a function returning the (truth or other) value of a feature: 't' a truthfunctional value (here, true); '(p)' the 'fundamental question' - or 'root' - and '[x]' its default value; 'U-->' a logical connective for exception; '(q)' an exception condition to the initial 'belief state' '(p)=x'; '(r)' an exception condition to the belief state '(p)=x'' resulting when '(q)=t']. (It will be noted, however, that the basic structure could readily be expanded to include more conventional logical operators where, for example, a domain concerned features in various conjunct or disjunct arrangements).

A situation may arise where there is more than one holding or sticking node in a lattice, and where the holding or sticking nodes have differing advice. There are many possible conflict resolution strategies which may be used in such a case, and include the following:

(i) An "enabling" strategy. Where any node returning root value indicator "true" overrules any node returning root value indicator "false".

(ii) A "proving" strategy where any node(s) returning root value indicators supporting the root default overrule any which differ.

(iii) A "disabling" strategy. Where any node returning root value indicator "false" overrules any node returning "true".

(iv) A "disproving" strategy, where any node(s) returning root value indicators differing from the root default value overrule any which support it (v) An "exception seeking" strategy. Where any node that returns a root value indicator "overturning" the default of the root node overrules any node returning a root value indicator "confirming" the default of the root node.

In the situation where more than one holding or sticking node occurs in a lattice, and the holding or sticking nodes have differing advice, the mode used will be dependent upon the domain and is identified as part of the knowledge elicitation process.

An example of overturning a belief state may be as follows:

Your car may start more days than not, thus, the statement "*car will start*" *(default: true)* may be constructed. If, one day it is found that a battery on the car is dead this will usually entail that the car will not start. If you also know that the

-42- petrol tank is full and that the remainder of the electrical system is in good working condition, and similarly that the state of the rest of the vehicle is in good condition, this will not be enough to contradict the fact that the battery is dead and the car will not start, because the condition of the battery and its effect on the car's ability to start is sufficiently independent of these. However, finding that the battery connectors are not connected properly could lead to finding the battery was not in fact dead, thus contradicting the original overturning information.

Another reason one might use an exception seeking strategy is that it is a characteristic of this strategy which allows a guarantee that rules generated from lattices will be consistent. This is because there only needs to be generated a set of rules which correspond with the sub set of nodes in the diagram whose root value indicator is opposite to the default of the root. That is, all the rules generated for a given feature will set the feature one way only, i.e. against its default. If none of the rules fire then the feature will take its default. This then expresses that if there is information available that causes us to alter a belief state, then the belief state will be altered. Otherwise the belief state will stand unaltered. Practically, the situation in which rules fire trying to set opposite values does not occur.

For example, in the context of usage of the implementation herein for collection of advice data from a set of experts or advisers in the field of financial services, a human user of an expert system, based around a computer entity, in a scenario where the user is recommending financial products to a client, can have expert knowledge available as an output of the expert system. The adviser is helped by the expert system to give advice on the best product for the client, but also an explanation of the advice given can be generated as an output system at the end of a client consultation process, which is intelligible, detailed and rich, and additionally, an audit trail of advice and knowledge can be produced, which can be checked against the current thinking and knowledge of experts and/or advisers in the field or against a knowledge source. The advice output of the expert system can be verified as being up to date and inline with current practice as defined by current knowledge of human experts, because the source of the knowledge data within the computer entity can be found for any particular output of the expert system, thereby giving transparency and full accountability of an output of the expert system. The audit trail is traceable to the extent that it can go back to any individual piece of expertise elicited from specific individuals by a specific individual at a specific time.

What is claimed is:

1. A method of data acquisition for collecting data for entry into a computer entity, said method comprising the processes of:

compiling a set of a plurality of knowledge data statements each knowledge data statement representing an element of a knowledge domain;

creating one or a plurality of lattice data, each said lattice data comprising a plurality of nodes, each said node representing a knowledge data statement, said plurality of nodes arranged as a root node and a plurality of child nodes arranged in an hierarchical structure, leading to said root node;

said lattice data defining belief states resulting from inter relationships between said plurality of knowledge data statements;

creating a consistency matrix, said consistency matrix comprising an array of data entries representing consistency relationships between said plurality of knowledge data statements;

storing said knowledge data statements in a data storage device of said computer entity;

storing said consistency matrix in a data storage device of said computer entity; and storing said lattice data in said data storage device of said computer entity;

wherein each said knowledge data statement is obtained as a result of a knowledge elicitation process which seeks to overturn a belief statement represented by said set of nodes.

2. The method as claimed in claim 1, comprising the processes of:

inputting said plurality of knowledge data statements into said computer entity; and inputting said lattice data into said computer entity.

3. The method as claimed in claim 1, wherein said process of creating a said lattice data comprises:

creating an hierarchical structure network comprising a plurality of nodes and a plurality of connections between said nodes, wherein individual said knowledge data statements comprise a root node, at least one intermediate node, and at least one leaf node of said hierarchical structure; and said plurality of connections comprise logical connectivity relationships between said plurality of nodes.

4. The method as claimed in claim 1, wherein said step of creating a lattice data comprises:

creating an hierarchical structure network comprising a plurality of nodes and a plurality of connections between said nodes, wherein individual said knowledge data statements comprise a root node, at least one intermediate node, and at least one leaf node of said hierarchical structure;

said plurality of connections comprise logical connectivity relationships between said plurality of nodes; and assigning to each said node, a knowledge statement name, and a root value indicator.

5. A method of knowledge acquisition for entering data into a computer database in a readily computable format, said method comprising:

eliciting a set of data statements using a questioning structure determined from an underlying mathematical base, combined with a genuine falsificationist epistemology;

entering elicited data statements into said database wherein said data statements are structured as a plurality of data entries, each data entry comprising a label, a said data statement, and a root value indicator;

storing a relationship between said data entries as a connectivity lattice, said connectivity lattice structured in an hierarchical lattice structure; and storing consistency data representing a set of consistency relationships between said plurality of knowledge statements, in a matrix format.

* * * * *